US012725377B2

(12) United States Patent
Favale et al.

(10) Patent No.: US 12,725,377 B2
(45) Date of Patent: Sep. 1, 2026

(54) OBJECT MODELING BASED ON PROPERTIES AND IMAGES OF AN OBJECT

(71) Applicant: Lowe's Companies, Inc., Mooresville, NC (US)

(72) Inventors: Ryan James Favale, Everett, WA (US); Erin Frederick Clark, Everett, WA (US); Joseph Jon Barnard, Waxhaw, NC (US); Brandon Scott Austin, Burien, WA (US); Philip Ashton Harlow, Bothell, WA (US); Jay Zeng, Shoreline, WA (US); Jeffrey S. Blazier, Sammamish, WA (US)

(73) Assignee: Lowe's Companies, Inc., Mooresville, NC (US)

( * ) Notice: Subject to any disclaimer, the term of this patent is extended or adjusted under 35 U.S.C. 154(b) by 1049 days.

(21) Appl. No.: 17/849,533

(22) Filed: Jun. 24, 2022

(65) Prior Publication Data

US 2023/0419627 A1 Dec. 28, 2023

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01); *G06T 2200/24* (2013.01); *G06T 2219/2004* (2013.01); *G06T 2219/2016* (2013.01)

(58) Field of Classification Search
CPC ... G06T 19/20; G06T 19/006; G06T 2200/24; G06T 2219/2004; G06T 2219/2016
See application file for complete search history.

(56) References Cited

U.S. PATENT DOCUMENTS 5,251,156 A 10/1993 Heier et al.
5,689,669 A * 11/1997 Lynch .................. G06F 3/0481 715/848

(Continued)

FOREIGN PATENT DOCUMENTS

CA 2825498 C 5/2017
CN 104765915 A 7/2015

(Continued)

OTHER PUBLICATIONS

U.S. Appl. No. 17/849,540, "Non-Final Office Action", Jun. 12, 2024, 27 pages.

(Continued)

*Primary Examiner* — Nicholas Augustine
(74) *Attorney, Agent, or Firm* — Kilpatrick Townsend & Stockton LLP

(57) ABSTRACT

A modeling system receives, via a user interface of a device, a selection of a three-dimensional shape that includes a plurality of faces. The modeling system generates a virtual object by: receiving an image showing a portion of a real-world object, determining an area of the image that corresponds to the portion of the real-world object, associating, in the virtual object, the area of the image with a face of the plurality of faces of the three-dimensional shape, and associating, in the virtual object or in metadata of the virtual object, properties of the three-dimensional shape with the virtual object. The virtual modeling system presents the virtual object in the user interface by at least showing the area of the image superimposed on the face and showing the properties.

20 Claims, 11 Drawing Sheets

User interface 211
(View of reset)

(56) References Cited

U.S. PATENT DOCUMENTS 5,862,252 A 1/1999 Yamamoto et al.
5,949,373 A 9/1999 Eslambolchi et al.
6,002,853 A * 12/1999 de Hond ............... G06F 16/954 709/219
6,025,847 A 2/2000 Marks
6,119,147 A * 9/2000 Toomey ............... G06Q 10/109 719/329
6,175,647 B1 1/2001 Schick et al.
6,184,847 B1 * 2/2001 Fateh ..................... G06F 3/012 715/729
6,195,455 B1 2/2001 Mack et al.
6,201,546 B1 3/2001 Bodor et al.
6,219,045 B1 * 4/2001 Leahy ..................... H04L 67/10 709/204
6,243,091 B1 * 6/2001 Berstis ................ G06F 3/04815 715/205
6,252,538 B1 6/2001 Chignell
6,271,843 B1 * 8/2001 Lection ................... G06T 15/00 715/848
6,362,817 B1 * 3/2002 Powers ................... G06T 17/00 345/428
6,396,522 B1 * 5/2002 Vu ...................... G06F 3/04845 715/848
6,414,679 B1 * 7/2002 Miodonski ............. G06T 13/00 707/999.005
6,570,563 B1 * 5/2003 Honda .................. A63F 13/352 345/473
6,573,903 B2 * 6/2003 Gantt ...................... G06F 30/00 345/619
6,590,593 B1 * 7/2003 Robertson ........... G06F 3/04815 715/848
6,611,617 B1 8/2003 Crampton
6,621,508 B1 * 9/2003 Shiraishi ............... G06F 3/0481 715/764
6,661,914 B2 12/2003 Dufour
6,690,393 B2 * 2/2004 Heron ..................... G06T 19/00 715/848
6,748,340 B2 6/2004 Otsuki et al.
6,784,901 B1 * 8/2004 Harvey ................... H04L 67/02 715/848
6,816,819 B1 11/2004 Loveland
6,858,826 B2 2/2005 Mueller et al.
6,961,055 B2 * 11/2005 Doak ...................... A63F 13/63 345/677
6,983,064 B2 1/2006 Song
7,127,378 B2 10/2006 Hoffman et al.
7,382,288 B1 * 6/2008 Wilson ..................... G08G 5/21 340/972
7,391,424 B2 6/2008 Lonsing
7,414,629 B2 * 8/2008 Santodomingo ........ G06T 17/05 345/582
7,467,356 B2 * 12/2008 Gettman ................ G06Q 30/02 715/850
7,474,803 B2 1/2009 Petrov et al.
7,523,411 B2 4/2009 Carlin
7,551,760 B2 6/2009 Scharlack et al.
7,627,502 B2 12/2009 Cheng et al.
7,653,877 B2 * 1/2010 Matsuda ............... G06F 16/957 463/32
7,663,625 B2 * 2/2010 Chartier .................. G06T 19/20 700/182
7,699,226 B2 4/2010 Smith et al.
7,710,420 B2 5/2010 Nonclercq et al.
7,728,833 B2 6/2010 Verma et al.
7,746,343 B1 * 6/2010 Charaniya ................ G06N 7/01 345/428
7,768,656 B2 8/2010 Lapa et al.
7,788,323 B2 * 8/2010 Greenstein ............. G06Q 10/10 715/744
7,814,429 B2 * 10/2010 Buffet ..................... G06F 30/00 715/763
7,817,150 B2 * 10/2010 Reichard ................. G06T 15/20 715/705
7,844,724 B2 * 11/2010 Van Wie ............... H04L 67/131 709/227
7,873,643 B2 1/2011 Hadzikadic et al.
7,885,865 B2 2/2011 Benson et al.
7,957,998 B2 6/2011 Riley et al.
8,054,460 B2 11/2011 Agapiou et al.
8,107,086 B2 1/2012 Hart et al.
8,189,963 B2 5/2012 Li et al.
8,207,963 B2 6/2012 Cotter et al.
8,244,508 B1 8/2012 Dean et al.
8,249,941 B2 8/2012 Saul et al.
RE43,895 E 1/2013 Crampton
8,345,252 B2 1/2013 Nisper et al.
8,358,201 B1 1/2013 Haddy
8,427,656 B2 4/2013 Hullin et al.
8,429,004 B2 4/2013 Hamilton et al.
8,463,025 B2 6/2013 Melvin et al.
8,488,877 B1 7/2013 Owechko et al.
8,510,338 B2 8/2013 Cushman, II et al.
8,525,846 B1 9/2013 Hickman et al.
8,538,128 B2 9/2013 Mellin et al.
8,547,247 B1 10/2013 Haddy
8,611,694 B2 12/2013 Kogan et al.
8,654,121 B1 2/2014 Yu et al.
8,668,498 B2 3/2014 Calman et al.
8,682,045 B2 3/2014 Vining et al.
8,687,104 B2 4/2014 Penov et al.
8,732,025 B2 5/2014 Gokturk et al.
8,787,679 B1 7/2014 Ramesh et al.
8,797,354 B2 8/2014 Noge
8,848,201 B1 9/2014 Bruce et al.
8,866,847 B2 10/2014 Bedi et al.
8,878,648 B2 11/2014 Haddy
8,897,578 B2 11/2014 Huang et al.
8,941,641 B2 1/2015 Chen et al.
8,941,645 B2 1/2015 Grimaud
8,943,420 B2 1/2015 Goldthwaite et al.
8,953,037 B2 2/2015 Wang et al.
8,989,440 B2 3/2015 Klusza et al.
9,001,154 B2 4/2015 Meier et al.
9,053,392 B2 6/2015 Yang et al.
9,074,986 B2 7/2015 Pal et al.
9,102,055 B1 8/2015 Konolige et al.
9,137,511 B1 9/2015 LeGrand, III et al.
9,157,855 B2 10/2015 Tin et al.
9,189,854 B2 11/2015 Dhua et al.
9,208,401 B2 12/2015 Westphal
9,245,170 B1 1/2016 Nikic et al.
9,245,382 B2 1/2016 Zhou et al.
9,280,560 B1 3/2016 Dube et al.
9,292,969 B2 3/2016 Laffargue et al.
9,307,231 B2 4/2016 Mallet et al.
9,307,232 B1 4/2016 Warner
9,324,179 B2 4/2016 Wooley et al.
9,325,966 B2 4/2016 Tin
9,329,305 B2 5/2016 Sieracki
9,349,200 B2 5/2016 Cardno
9,359,880 B2 6/2016 Narayan et al.
9,367,909 B2 6/2016 Tin
9,373,195 B2 6/2016 Kasahara
9,378,065 B2 6/2016 Shear et al.
9,384,594 B2 7/2016 Maciocci et al.
9,417,185 B1 8/2016 Bruce et al.
9,433,350 B2 9/2016 Schönborn et al.
9,444,977 B2 9/2016 Moesle et al.
9,473,747 B2 10/2016 Kobres et al.
9,509,905 B2 11/2016 Gordon et al.
9,516,278 B1 12/2016 Renkis
9,524,547 B2 12/2016 Graumann et al.
9,542,770 B1 * 1/2017 Lininger ................. G06T 15/04
9,547,838 B2 1/2017 Larsen
9,552,650 B2 1/2017 Furuya
9,563,825 B2 2/2017 Shen et al.
9,607,226 B2 3/2017 Zhu et al.
9,607,422 B1 3/2017 Leedom
9,613,300 B2 4/2017 Tin et al.
9,619,944 B2 4/2017 Finn et al.
9,626,801 B2 4/2017 Mullins
9,645,237 B2 5/2017 Stolarczyk

(56) References Cited

U.S. PATENT DOCUMENTS 9,672,497 B1 6/2017 Lewis et al.
9,697,416 B2 7/2017 Shen et al.
9,728,010 B2 8/2017 Thomas et al.
9,787,904 B2 10/2017 Birkler et al.
9,928,438 B2 3/2018 Wu et al.
9,972,158 B2 5/2018 Schtein et al.
9,990,767 B1 6/2018 Sheffield et al.
10,013,506 B2 7/2018 Reeves et al.
10,019,803 B2 7/2018 Venable et al.
10,031,974 B1 7/2018 Abdullah et al.
10,078,826 B2 9/2018 Morandi et al.
10,122,997 B1 11/2018 Sheffield et al.
10,157,503 B2 12/2018 Tran et al.
10,163,271 B1 12/2018 Powers et al.
10,192,115 B1 1/2019 Sheffield et al.
10,235,797 B1 3/2019 Sheffield et al.
10,235,810 B2 3/2019 Morrison
10,289,990 B2 5/2019 Rizzolo et al.
10,304,251 B2 5/2019 Pahud et al.
10,366,531 B2 7/2019 Sheffield
10,387,897 B2 8/2019 Sakata et al.
10,395,435 B2 8/2019 Powers et al.
10,424,110 B2 9/2019 Sheffield et al.
10,438,165 B2 10/2019 Findlay
10,521,645 B2 12/2019 Adato et al.
10,565,548 B2 2/2020 Skaff et al.
10,580,202 B2 3/2020 Sheffield et al.
10,592,855 B2 3/2020 Griffin et al.
10,657,712 B2 5/2020 Sheffield et al.
10,671,856 B1 6/2020 Ren et al.
10,679,181 B1 6/2020 Prater et al.
10,679,372 B2 6/2020 Sheffield
10,733,661 B1 8/2020 Bergstrom et al.
10,755,483 B1 8/2020 Cote
10,769,582 B2 9/2020 Williams et al.
10,780,349 B2 * 9/2020 Hrinčár .................. A63F 13/54
10,885,493 B2 1/2021 Hassan et al.
10,885,577 B2 1/2021 Parker et al.
10,895,913 B1 * 1/2021 Patel ...................... G06F 3/014
10,956,967 B2 3/2021 Ayush et al.
10,970,932 B2 4/2021 Leppanen et al.
11,062,139 B2 7/2021 Sheffield et al.
11,093,785 B1 8/2021 Siddiquie et al.
11,120,459 B2 9/2021 Vaculin et al.
11,126,961 B2 9/2021 Kulkarni Wadhonkar et al.
11,263,795 B1 3/2022 Desai et al.
11,270,510 B2 3/2022 Warhol
11,354,549 B2 6/2022 Shaw et al.
11,373,320 B1 6/2022 Le et al.
11,423,075 B2 8/2022 Morate et al.
11,468,500 B2 10/2022 Roesbery et al.
11,481,746 B2 10/2022 Wu et al.
11,488,104 B2 11/2022 Soon-Shiong
11,514,765 B2 11/2022 Blaser
11,544,668 B2 1/2023 Bahirat et al.
11,562,314 B2 1/2023 Morate et al.
11,568,356 B1 1/2023 Rochon et al.
11,829,679 B2 * 11/2023 Smith .................. G06F 3/1454
12,189,915 B2 1/2025 Favale et al.
12,211,161 B2 1/2025 Favale et al.
12,315,090 B1 * 5/2025 Suresh .................. G06V 20/20
2001/0018667 A1 * 8/2001 Kim .................. G06Q 30/0277 705/14.73
2002/0095463 A1 * 7/2002 Matsuda .............. G06F 16/957 709/204
2002/0113820 A1 * 8/2002 Robinson ............. G06F 16/954 715/764
2002/0140695 A1 10/2002 Weiss
2003/0030636 A1 2/2003 Yamaoka et al.
2003/0071194 A1 4/2003 Mueller et al.
2003/0110099 A1 6/2003 Trajkovic et al.
2003/0137506 A1 7/2003 Efran et al.
2003/0174179 A1 9/2003 Suermondt et al.
2005/0021499 A1 1/2005 Bradley et al.
2005/0035980 A1 2/2005 Lonsing
2005/0093719 A1 * 5/2005 Okamoto ........... G01C 21/3697 705/14.62
2005/0128212 A1 * 6/2005 Edecker .................. G06T 17/05 345/581
2005/0286799 A1 12/2005 Huang et al.
2005/0289590 A1 * 12/2005 Cheok .................. G06F 3/0346 725/62
2006/0149634 A1 7/2006 Pelegrin et al.
2006/0200518 A1 * 9/2006 Sinclair .................. H04N 7/142 348/E7.083
2007/0035539 A1 2/2007 Matsumura et al.
2007/0253618 A1 11/2007 Kim et al.
2007/0285560 A1 12/2007 Perlman
2008/0082426 A1 4/2008 Gokturk et al.
2008/0144934 A1 6/2008 Raynaud
2008/0235570 A1 * 9/2008 Sawada .................. G06Q 10/10 356/3
2008/0246759 A1 10/2008 Summers
2008/0252640 A1 10/2008 Williams
2008/0273801 A1 11/2008 Podilchuk
2009/0067706 A1 3/2009 Lapa
2009/0094260 A1 4/2009 Cheng et al.
2010/0191770 A1 7/2010 Cho et al.
2010/0231692 A1 9/2010 Perlman et al.
2010/0275018 A1 10/2010 Pedersen
2010/0290032 A1 11/2010 Bugge
2010/0290697 A1 11/2010 Benitez et al.
2010/0315422 A1 12/2010 Andre et al.
2010/0321386 A1 12/2010 Lin et al.
2011/0040539 A1 2/2011 Szymczyk et al.
2011/0187713 A1 8/2011 Pershing et al.
2011/0193939 A1 * 8/2011 Vassigh .................. G06F 3/011 348/169
2012/0056992 A1 * 3/2012 Kuroda ................ G06T 19/006 348/46
2012/0062596 A1 3/2012 Bedi et al.
2012/0113141 A1 * 5/2012 Zimmerman ........... G06T 11/00 345/633
2012/0120113 A1 5/2012 Hueso
2012/0212484 A1 * 8/2012 Haddick ................ G06Q 30/02 345/419
2012/0212509 A1 * 8/2012 Benko .................. H04N 13/275 345/633
2012/0223943 A1 9/2012 Williams et al.
2012/0233555 A1 * 9/2012 Psistakis ............. G11B 27/034 715/751
2012/0242795 A1 9/2012 Kane et al.
2012/0249741 A1 * 10/2012 Maciocci ............. G06T 19/006 348/51
2013/0004060 A1 1/2013 Bell et al.
2013/0024819 A1 * 1/2013 Rieffel .................... G06F 3/011 715/848
2013/0083018 A1 * 4/2013 Geisner .................. G06F 3/011 345/633
2013/0083064 A1 * 4/2013 Geisner .................. G06F 3/011 345/633
2013/0103608 A1 4/2013 Scipioni et al.
2013/0135450 A1 5/2013 Pallone et al.
2013/0147839 A1 6/2013 Fukushima et al.
2013/0196772 A1 8/2013 Latta et al.
2013/0215235 A1 8/2013 Russell
2013/0249948 A1 9/2013 Reitan
2013/0275089 A1 10/2013 Gary
2013/0293539 A1 11/2013 Hunt et al.
2013/0317950 A1 11/2013 Abraham et al.
2014/0002443 A1 * 1/2014 Cunningham ........ G06T 19/006 345/419
2014/0012503 A1 1/2014 Haddy
2014/0022355 A1 1/2014 Poursohi et al.
2014/0043436 A1 2/2014 Bell et al.
2014/0049559 A1 2/2014 Fleck et al.
2014/0072213 A1 3/2014 Paiton et al.
2014/0082610 A1 3/2014 Wang et al.
2014/0118402 A1 5/2014 Gallo et al.
2014/0125654 A1 5/2014 Oh
2014/0171039 A1 6/2014 Bjontegard
2014/0172553 A1 6/2014 Goulart
2014/0207420 A1 7/2014 Edwards et al.

(56) References Cited

U.S. PATENT DOCUMENTS

2014/0210856 A1 7/2014 Finn et al.
2014/0225814 A1 8/2014 English et al.
2014/0225978 A1 8/2014 Saban et al.
2014/0267228 A1 9/2014 Ofek et al.
2014/0267717 A1 9/2014 Pitzer et al.
2014/0282220 A1 9/2014 Wantland et al.
2014/0293011 A1 10/2014 Lohry et al.
2014/0333615 A1 11/2014 Ramalingam et al.
2014/0351078 A1 11/2014 Kaplan et al.
2015/0003723 A1 1/2015 Huang et al.
2015/0043225 A1 2/2015 Goodman et al.
2015/0049170 A1 2/2015 Kapadia et al.
2015/0058116 A1 2/2015 Liu et al.
2015/0073947 A1 3/2015 Higgins et al.
2015/0095196 A1 4/2015 Burks et al.
2015/0116509 A1 4/2015 Birkler et al.
2015/0138320 A1 5/2015 El Daher
2015/0147460 A1 5/2015 Manzi et al.
2015/0153444 A1 6/2015 Nichols et al.
2015/0161818 A1 6/2015 Komenczi et al.
2015/0164335 A1 6/2015 Van et al.
2015/0169994 A1 6/2015 Chinen et al.
2015/0170260 A1 6/2015 Lees et al.
2015/0178986 A1 6/2015 Schpok
2015/0186894 A1 7/2015 Mosier
2015/0193971 A1 7/2015 Dryanovski et al.
2015/0208043 A1 7/2015 Lee et al.
2015/0242542 A1 8/2015 Bosdriesz
2015/0256813 A1 9/2015 Dal Mutto et al.
2015/0269785 A1 9/2015 Bell et al.
2015/0288951 A1 10/2015 Mallet et al.
2015/0302027 A1 10/2015 Wnuk et al.
2015/0312550 A1 10/2015 Robert
2015/0331970 A1 11/2015 Jovanovic
2015/0332513 A1 11/2015 Scavezze et al.
2015/0339853 A1 11/2015 Wolper et al.
2016/0004300 A1* 1/2016 Baic .................... G06F 3/0346 345/419
2016/0005228 A1 1/2016 Niebla, Jr. et al.
2016/0026253 A1* 1/2016 Bradski ................ H04N 13/128 345/8
2016/0035538 A1 2/2016 Fukuda
2016/0048497 A1 2/2016 Goswami
2016/0055268 A1 2/2016 Bell et al.
2016/0071318 A1 3/2016 Lee et al.
2016/0086078 A1 3/2016 Ji et al.
2016/0088275 A1 3/2016 Fuchikami
2016/0092608 A1 3/2016 Yamamoto et al.
2016/0125650 A1 5/2016 Crocker et al.
2016/0147408 A1 5/2016 Bevis et al.
2016/0149123 A1 5/2016 Park et al.
2016/0174902 A1 6/2016 Georgescu et al.
2016/0180193 A1 6/2016 Masters et al.
2016/0189426 A1 6/2016 Thomas et al.
2016/0196691 A1 7/2016 Crocker
2016/0202048 A1 7/2016 Meng et al.
2016/0217225 A1 7/2016 Bell et al.
2016/0217615 A1 7/2016 Kraver
2016/0266939 A1 9/2016 Shear et al.
2016/0275376 A1 9/2016 Kant
2016/0284116 A1 9/2016 Crain et al.
2016/0284121 A1 9/2016 Azuma
2016/0292592 A1 10/2016 Patthak et al.
2016/0300293 A1 10/2016 Nagar
2016/0343140 A1 11/2016 Ciprari et al.
2016/0364793 A1 12/2016 Sacco
2016/0364874 A1 12/2016 Tohme et al.
2016/0371846 A1 12/2016 Stars et al.
2017/0011558 A1 1/2017 Meier et al.
2017/0018120 A1 1/2017 Li et al.
2017/0021273 A1 1/2017 Rios
2017/0039613 A1 2/2017 Kaehler et al.
2017/0039986 A1 2/2017 Lanier et al.
2017/0046844 A1 2/2017 Jones et al.
2017/0046868 A1 2/2017 Chernov et al.
2017/0046873 A1 2/2017 Terry et al.
2017/0053042 A1 2/2017 Sugden et al.
2017/0053542 A1* 2/2017 Wilson .................... G06F 3/011
2017/0054954 A1 2/2017 Keitler et al.
2017/0059305 A1 3/2017 Nonn et al.
2017/0061286 A1 3/2017 Kumar et al.
2017/0064214 A1* 3/2017 Zhang .................... H04N 23/11
2017/0085863 A1 3/2017 Lopez et al.
2017/0092014 A1 3/2017 Perlman et al.
2017/0103510 A1 4/2017 Wang et al.
2017/0109874 A1 4/2017 Hallasch et al.
2017/0109924 A1 4/2017 Crocker
2017/0109931 A1 4/2017 Knorr et al.
2017/0123750 A1 5/2017 Todasco
2017/0132497 A1 5/2017 Santos et al.
2017/0140236 A1 5/2017 Price et al.
2017/0154425 A1 6/2017 Pierce et al.
2017/0161590 A1 6/2017 Boulkenafed et al.
2017/0161592 A1 6/2017 Su et al.
2017/0161960 A1 6/2017 High et al.
2017/0168488 A1 6/2017 Wierzynski et al.
2017/0176979 A1 6/2017 Lalish et al.
2017/0178272 A1 6/2017 Lashkari et al.
2017/0193694 A1 7/2017 Freund et al.
2017/0200313 A1 7/2017 Lee et al.
2017/0201735 A1 7/2017 Tyshchenko et al.
2017/0220887 A1 8/2017 Fathi et al.
2017/0229154 A1 8/2017 Bose et al.
2017/0272651 A1 9/2017 Mathy et al.
2017/0301104 A1 10/2017 Qian et al.
2017/0318407 A1 11/2017 Meister et al.
2017/0329488 A1* 11/2017 Welker .................... G06F 3/011
2017/0336882 A1* 11/2017 Tome .................. G06F 3/03547
2018/0056515 A1 3/2018 Boca et al.
2018/0056801 A1 3/2018 Leary
2018/0060946 A1 3/2018 Devries
2018/0068489 A1 3/2018 Kim et al.
2018/0075658 A1* 3/2018 Lanier ................... G06T 11/001
2018/0121869 A1 5/2018 Bradley et al.
2018/0144535 A1 5/2018 Ford et al.
2018/0204329 A1 7/2018 Cutu et al.
2018/0218513 A1 8/2018 Ho
2018/0253895 A1 9/2018 Arumugam
2018/0324401 A1 11/2018 Sheffield et al.
2018/0330480 A1 11/2018 Liu et al.
2018/0365495 A1 12/2018 Laycock et al.
2018/0367835 A1 12/2018 Hamidi-Rad et al.
2019/0005717 A1* 1/2019 Singh ...................... G06T 15/80
2019/0007659 A1 1/2019 Neubauer et al.
2019/0025905 A1 1/2019 Godina et al.
2019/0035149 A1* 1/2019 Chen .................... G06V 40/166
2019/0057551 A1 2/2019 Mathwig et al.
2019/0087019 A1* 3/2019 Raja ........................ G06F 3/011
2019/0122422 A1 4/2019 Sheffield et al.
2019/0122425 A1 4/2019 Sheffield
2019/0156545 A1 5/2019 Horn et al.
2019/0164335 A1 5/2019 Sheffield et al.
2019/0180104 A1 6/2019 Sheffield et al.
2019/0183577 A1 6/2019 Fahim et al.
2019/0235739 A1* 8/2019 Bowen .................. G06F 3/0482
2019/0266793 A1 8/2019 Sheffield et al.
2019/0279284 A1 9/2019 Sunday et al.
2019/0311538 A1 10/2019 Vadakkeveedu et al.
2019/0313059 A1* 10/2019 Agarawala ............. G06F 3/011
2019/0362513 A1 11/2019 Sheffield
2019/0362551 A1 11/2019 Sheffield et al.
2019/0378333 A1* 12/2019 Castaneda ............... G06T 7/251
2020/0034918 A1 1/2020 Naware et al.
2020/0183969 A1* 6/2020 Wiesel .................. G06F 16/583
2020/0250889 A1* 8/2020 Li ............................ G06T 7/73
2020/0258315 A1* 8/2020 Li .......................... G06T 19/20
2020/0265599 A1 8/2020 Sheffield
2020/0368616 A1 11/2020 Delamont
2020/0380457 A1 12/2020 Soon-Shiong
2021/0073901 A1 3/2021 Yankovich et al.
2021/0096726 A1* 4/2021 Faulkner ............. G06F 3/04815
2021/0125409 A1* 4/2021 Mirza .................... G06V 40/20
2021/0134072 A1 5/2021 Uppal et al.
2021/0137350 A1 5/2021 Inglis et al.

(56) References Cited

U.S. PATENT DOCUMENTS

| | | | | |
|---|---|---|---|---|
| 2021/0142582 | A1* | 5/2021 | Jones | G02B 27/0172 |
| 2021/0233496 | A1* | 7/2021 | Babu Jd | G06F 3/011 |
| 2021/0248669 | A1 | 8/2021 | Wade et al. | |
| 2021/0248811 | A1 | 8/2021 | Shan et al. | |
| 2021/0248823 | A1* | 8/2021 | Rolion | G06T 15/04 |
| 2021/0295052 | A1 | 9/2021 | Sheffield et al. | |
| 2021/0329121 | A1* | 10/2021 | Spivack | G06T 19/003 |
| 2021/0335039 | A1* | 10/2021 | Jones | G06V 10/82 |
| 2021/0350634 | A1* | 11/2021 | Major | G06T 17/00 |
| 2022/0019799 | A1* | 1/2022 | Eyjolfsdottir | G06V 10/462 |
| 2022/0027671 | A1* | 1/2022 | Mukherjee | G06V 20/20 |
| 2022/0075907 | A1 | 3/2022 | Vellasques et al. | |
| 2022/0155850 | A1 | 5/2022 | Kodelh et al. | |
| 2022/0198762 | A1* | 6/2022 | Komoriya | G06V 20/20 |
| 2022/0230216 | A1 | 7/2022 | Buibas et al. | |
| 2022/0397862 | A1 | 12/2022 | Karafin et al. | |
| 2023/0015235 | A1 | 1/2023 | Van Der Heijden et al. | |
| 2023/0030247 | A1* | 2/2023 | Sevostianov | H04N 13/117 |
| 2023/0377279 | A1* | 11/2023 | Varis Doggett | A63F 13/65 |
| 2023/0393715 | A1 | 12/2023 | Jensen et al. | |
| 2023/0415040 | A1* | 12/2023 | Ohashi | A63F 13/52 |
| 2024/0394676 | A1* | 11/2024 | Siddique | G06Q 30/02 |
| 2025/0095287 | A1* | 3/2025 | Sakurahara | G01B 21/00 |

FOREIGN PATENT DOCUMENTS

| | | | |
|---|---|---|---|
| CN | 104866691 | A | 8/2015 |
| CN | 106446033 | A | 2/2017 |
| DE | 4229349 | C2 | 5/1995 |
| DE | 102010010296 | A1 | 9/2011 |
| JP | 3609669 | B9 | 10/2004 |
| JP | 2006098065 | A | 4/2006 |
| JP | 4168040 | B2 | 10/2008 |
| JP | 4700739 | B2 | 6/2011 |
| JP | 6095664 | B2 | 2/2017 |
| KR | 20130137968 | A | 12/2013 |
| KR | 20140081729 | A | 7/2014 |
| KR | 20140082610 | A | 7/2014 |
| KR | 101450133 | B1 | 10/2014 |
| KR | 20160023161 | A | 3/2016 |
| KR | 20160072547 | A | 6/2016 |
| KR | 101650011 | A1 | 8/2016 |
| KR | 20160117704 | A | 10/2016 |
| KR | 101730296 | B1 | 4/2017 |
| KR | 101750546 | B1 | 6/2017 |
| KR | 20170132822 | A | 12/2017 |
| WO | 0223918 | A2 | 3/2002 |
| WO | 2009105126 | A1 | 8/2009 |
| WO | 2011055245 | A1 | 5/2011 |
| WO | 2014049301 | A1 | 4/2014 |
| WO | 2014074003 | A1 | 5/2014 |
| WO | 2015192117 | A1 | 12/2015 |
| WO | 2016075081 | A1 | 5/2016 |
| WO | 2016099471 | A1 | 6/2016 |
| WO | 2016116780 | A1 | 7/2016 |
| WO | 2016127173 | A1 | 8/2016 |
| WO | 2017100658 | A1 | 6/2017 |
| WO | 2017206451 | A1 | 12/2017 |
| WO | 2018204279 | A1 | 11/2018 |
| WO | 2019083832 | A1 | 5/2019 |
| WO | 2019104049 | A1 | 5/2019 |
| WO | 2019118599 | A3 | 7/2019 |
| WO | 2019164830 | A1 | 8/2019 |
| WO | 2019226560 | A1 | 11/2019 |
| WO | 2019226702 | A1 | 11/2019 |
| WO | 2020123114 | A1 | 6/2020 |
| WO | 2021165628 | A1 | 8/2021 |

OTHER PUBLICATIONS

U.S. Appl. No. 17/849,544, "Final Office Action", Jul. 16, 2024, 17 pages.
"3D Room Designer", Living Spaces, livingspaces.com, Jul. 2017, 5 pages.
"Augmented Reality for Subsurface Utilities", Available online at: https://www.youtube.com/watch?v=KS_5OHoHHuo, Jul. 20, 2013, 3 pages.
"Utility Safety: 3D Data—Virtual reality for Electrical Utilities", Available Online: http://www.utilityproducts.com/articles/2015/03/utility-safety-3d-data-virtual-realityfor-electrical-utilities.html, Mar. 11, 2015, 6 pages.
U.S. Appl. No. 15/586,207, "Advisory Action", Apr. 4, 2018, 3 pages.
U.S. Appl. No. 15/586,207, "Final Office Action", Jan. 8, 2018, 24 pages.
U.S. Appl. No. 15/586,207, "Non-Final Office Action", Jun. 28, 2017, 22 pages.
U.S. Appl. No. 15/586,207, "Notice of Allowance", Jun. 14, 2018, 8 Pages.
"U.S. Appl. No. 15/586,207", Automated Matrix Photo Framing Using Range Camera Input, May 3, 2017, pp. 1-42.
U.S. Appl. No. 15/791,940, "Notice of Allowance", Feb. 2, 2018, 10 pages.
U.S. Appl. No. 15/823,055, "Final Office Action", Jul. 11, 2018, 50 pages.
U.S. Appl. No. 15/823,055, "Non-Final Office Action", Feb. 9, 2018, 27 pages.
U.S. Appl. No. 15/823,055, "Notice of Allowance", Oct. 29, 2018, 8 pages.
U.S. Appl. No. 15/840,567, "Non-Final Office Action", Feb. 8, 2018, 35 pages.
U.S. Appl. No. 15/840,567, "Notice of Allowance", Sep. 17, 2018, 12 pages.
U.S. Appl. No. 15/903,501, "Final Office Action", Jul. 18, 2019, 25 pages.
U.S. Appl. No. 15/903,501, "Final Office Action", Sep. 14, 2018, 31 pages.
U.S. Appl. No. 15/903,501, "Final Office Action", May 1, 2020, 33 pages.
U.S. Appl. No. 15/903,501, "Non Final Office Action", Apr. 24, 2018, 19 Pages.
U.S. Appl. No. 15/903,501, "Non-Final Office Action", Feb. 1, 2019, 23 pages.
U.S. Appl. No. 15/903,501, "Non-Final Office Action", Nov. 20, 2019, 29 pages.
U.S. Appl. No. 15/977,724, "Non-Final Office Action", Sep. 18, 2018, 10 pages.
U.S. Appl. No. 15/977,724, "Notice of Allowance", Mar. 19, 2019, 5 pages.
U.S. Appl. No. 15/977,724, "Notice of Allowance", May 15, 2019, 5 pages.
U.S. Appl. No. 15/988,891, "Final Office Action", Feb. 1, 2019, 30 pages.
U.S. Appl. No. 15/988,891, "Final Office Action", Oct. 23, 2019, 35 pages.
U.S. Appl. No. 15/988,891, "Non-Final Office Action", Aug. 27, 2018, 24 pages.
U.S. Appl. No. 15/988,891, "Non-Final Office Action", Jun. 21, 2019, 34 pages.
U.S. Appl. No. 15/988,891, "Notice of Allowance", Feb. 4, 2020, 8 pages.
U.S. Appl. No. 15/990,429, "Advisory Action", Dec. 9, 2019, 8 pages.
U.S. Appl. No. 15/990,429, "Final Office Action", Aug. 22, 2019, 9 pages.
U.S. Appl. No. 15/990,429, "Non-Final Office Action", Jan. 11, 2019, 19 pages.
U.S. Appl. No. 15/990,429, "Notice of Allowance", Jan. 16, 2020, 12 pages.
U.S. Appl. No. 16/216,476, "Notice of Allowance", Mar. 5, 2019, 9 pages.
U.S. Appl. No. 16/222,333, "Final Office Action", Jan. 15, 2021, 27 pages.
U.S. Appl. No. 16/222,333, "Non-Final Office Action", Jul. 14, 2020, 26 pages.
U.S. Appl. No. 16/222,333, "Notice of Allowance", Mar. 19, 2021, 12 pages.

(56) References Cited

OTHER PUBLICATIONS

U.S. Appl. No. 16/256,461, "Non-Final Office Action", Jul. 11, 2019, 24 pages.
U.S. Appl. No. 16/256,461, "Notice of Allowance", Oct. 28, 2019, 9 pages.
U.S. Appl. No. 16/866,801, "Final Office Action", Jun. 24, 2022, 29 pages.
U.S. Appl. No. 16/866,801, "Final Office Action", Oct. 29, 2021, 39 pages.
U.S. Appl. No. 16/866,801, "Non-Final Office Action", Feb. 16, 2022, 29 pages.
U.S. Appl. No. 16/866,801, "Non-Final Office Action", Mar. 4, 2021, 38 pages.
Amadeo, "Google Tango Review: Promising Google Tech Debuts on Crappy Lenovo Hardware", Ars Technica, Available online at https://arstechnica.com/gadgets/2016/12/google-tango-review-promising-google-tech-debuts-on-crappy-lenovo-hardware/, Mar. 15, 2018, 9 pages.
Behzadan et al., "Visualization of Construction Graphics in Outdoor Augmented Reality", Proceedings of the 37th conference on Winter simulation. Winter Simulation Conference. Available Online: https://pdfs.semanticscholar.org/05d1/a790dbc744a616c84aebec5c642eac7959c0.pdf, 2005, pp. 1-115.
Blum et al., "Selection of Relevant Features and Examples in Machine Learning", Artificial intelligence, vol. 97, No. 1, Dec. 1997, 24 pages.
Brennan, "New Jersey Utility Uses Augmented Reality to Visualise Underground Infrastructure", Available online at: https://www.roadtovr.com/utility-company-uses-augmented-reality-visualise-underground-infrastructure/, Mar. 27, 2018, 3 pages.
Brennan et al., "Virtualizing Living and Working Spaces: Proof of Concept For A Biomedical Space-Replication Methodology", Journal Of Biomedical Informatics vol. 57, Available online at: http://ac.els-cdn.com/S1532046415001471/1-s2.0-S1532046415001471-main.pdf?_tid=ccf847d4-7bc3-11e7-8930-00000aacb362&acdnat=1502146834_89e652ee1e1ee3672d9747963120432d, 2015, pp. 53-61.
Cheng et al., "Locality-Sensitive Deconvolution Networks with Gated Fusion for RGB-D Indoor Semantic Segmentation", Computer Vision Foundation, 2017, pp. 3029-3037.
Chilton et al., "Cascade: Crowdsourcing Taxonomy Creation", Proceedings of the SIGCHI Conference on Human Factors in Computing Systems, ACM, Apr. 27-May 2, 2013, pp. 1999-2008.
Choi et al., "Robust Reconstruction of Indoor Scenes", Proceedings of the IEEE Conference on Computer Vision and Pattern Recognition Available online at: http://www.cv-foundation.org/openaccess/content_cvpr_2015/papers/Choi_Robust_Reconstruction_of_2015_CVPR_paper.pdf, 2015, 10 pages.
Couprie et al., "Indoor Semantic Segmentation Using Depth Information", Arxiv Preprint Arxiv:1301.3572 Available online at: https://arxiv.org/pdf/1301.3572.pdf, 2013, 8 pages.
Coxworth , "Lynx A Camera Generates 3D Models In Real Time", New Atlas, newatlas.com Available online at: http://newatlas.com/lynx-a-3D-modeling-camera/26149/, Feb. 8, 2013, 27 pages.
Delage et al., "Automatic Single-image 3D Reconstructions Of Indoor Manhattan World Scenes", Robotics Research Available online at: https://pdfs.semanticscholar.org/5ea3/e6ef1012b9e7f39451364d68312595b544b8.pdf, 2007, pp. 305-321.
Deng et al., "Imagenet: A Large-Scale Hierarchical Image Database", Institute of Electrical and Electronics Engineers Conference on Computer Vision and Pattern Recognition, Jun. 20-25, 2009, pp. 248-255.
Dorsey et al., "Modeling and Rendering of Metallic Patinas", ACM SIGGRAPH 2006 Courses., 2006, pp. 387-396.
Geiger et al., "Joint 3D Object and Layout Inference From A Single RGB-D Image", German Conference on Pattern Recognition. Springer, Cham, Available online at: http://ww.w.cvlibs.net/publications/Geiger2015GCPR.pdf, 2015, 12 pages.
Gupta et al., "Aligning 3D Models To RGB-D Images of Cluttered Scenes", Proceedings of the IEEE Conference on Computer Vision and Pattern Recognition Available online at: http://www.cv-foundation.org/openaccess/content_cvpr_2015/papers/Gupta_Aligning_3D_Models_2015_CVPR_paper.pdf, 2015, 10 pages.
Gupta et al., "Structured Light 3d Scanning in the Presence of Global Illumination", IEEE Conference on. IEEE, Computer Vision and Pattern Recognition (CVPR), 2011, 10 pages.
Hermans et al., "Dense 3D Semantic Mapping of Indoor Scenes From RGB-D Images", Robotics and Automation (ICRA), 2014 IEEE International Conference on IEEE, Available online at: http://web-info8.informatik.rwth-aachen.de/media/papers/hermans-icra-2014.pdf, 2014, 8 pages.
Izadi et al., "KinectFusion: Real-time 3D Reconstruction and Interaction Using a Moving Depth Camera", Proceedings Of The 24th Annual Acm Symposium On User Interface Software And Technology, ACM, Available online at: https://www.microsoft.com/en-us/research/wp-content/uploads/2016/02/kinectfusion-uist-comp.pdf, 2011, 10 pages.
Izadinia et al., "IM2CAD", arXiv preprint arXiv:1608.05137, 2016, 11 pages.
Job, "Incredible New Augmented Reality System by Augview.net", www.youtube.com/watch?v=Mc9BFIx4MKU, Feb. 19, 2014, 1 page.
Kang et al., "Discovering Object Instances From Scenes of Daily Living", Computer Vision (ICCV), IEEE International Conference, 2011, 9 pages.
Karsch et al., "Rendering Synthetic Objects Into Legacy Photographs", ACM Transactions On Graphics (TOG). vol. 30, No. 6 Available online at: http://www.cs.jhu.edu/~misha/ReadingSeminar/Papers/Karsch11.pdf, 2011, 12 pages.
Lai et al., "A Large-Scale Hierarchical Multi-View rgb-d Object Dataset", Robotics and Automation (ICRA), IEEE International Conference on. IEEE, 2011, 8 pages.
Lai et al., "Detection-based Object Labeling In 3D Scenes", Robotics And Automation (ICRA), 2012 IEEE International Conference On. IEEE Available online at: http://ftp.idiap.ch/pub/courses/EE-700/material/12-12-2012/3Dobject-labelingicra-12.pdf, 2012, 8 pages.
Li et al., "Rgb-d Scene Labeling With Long Short-term Memorized Fusion Model", arXiv preprint arXiv:1604.05000, 2016, 17 pages.
Liu et al., "Learning Discriminative Illumination and Filters for Raw Material Classification With Optimal Projections of Bidirectional Texture Functions", Proceedings of the IEEE Conference on Computer Vision and Pattern Recognition, 2013, pp. 1430-1437.
Luongo, "Modeling A Modern Interior Scene In Blender", Envotus Tuts+, cgi.tutsplus.com Available online at: https://cgi.tutsplus.com/tutorials/modeling-a-modern-interior-scene-in-blender--cg-15294, May 18, 2012, 59 pages.
Massa et al., "Deep Exemplar 2d-3d Detection by Adapting From Real to Rendered Views", Proceedings of the IEEE Conference on Computer Vision and Pattern Recognition, 2016, pp. 6024-6033.
McCormac et al., "Semanticfusion: Dense 3d Semantic Mapping With Convolutional Neural Networks", Robotics and Automation (ICRA), IEEE International Conference, 2017, 7 pages.
Meehan, "NJ Utility on Forefront with New Mixed Reality Application", Available online At: https://www.esri.com/about/newsroom/publications/wherenext/nj-utility-on-forefront-with-new-mixed-reality-application/, Jun. 14, 2017, 7 pages.
Meriaudeau et al., "Non-Conventional Imaging Systems For 3D Digitization of Transparent Objects: Shape From Polarization In The IR And Shape From Visible Fluorescence Induced UV", AIP Conference Proceedings, vol. 1537, Issue 1, Jul. 9, 2012, 1 page.
Olivier, "Infrared System for 3D Scanning of Metallic Surfaces", Machine Vision and Applications, Springer Verlag, vol. 24, Sep. 23, 2013, pp. 1513-1524.
Pastorius , "Structured Light vs. Laser Triangulation for 3D Scanning and Inspection", LMI Technologies, Imi3d.com, Dec. 7, 2015, pp. 1-6.
PCT/US2018/030283, "International Preliminary Report on Patentability", Nov. 14, 2019, 15 pages.
PCT/US2018/030283, "International Search Report and Written Opinion", Sep. 11, 2018, 20 pages.
PCT/US2018/030283, "Invitation to Pay Add'l Fees and Partial Search Report", Jul. 17, 2018, 18 pages.
PCT/US2018/056664, "International Preliminary Report on Patentability", May 7, 2020, 19 pages.

(56) References Cited

OTHER PUBLICATIONS

PCT/US2018/056664, "International Search Report and Written Opinion", Feb. 8, 2019, 22 pages.
PCT/US2018/062037, "International Preliminary Report on Patentability", Jun. 11, 2020, 6 pages.
PCT/US2018/062037, "International Search Report and Written Opinion", Mar. 11, 2019, 9 pages.
PCT/US2018/065208, "International Preliminary Report on Patentability", Jun. 25, 2020, 9 pages.
PCT/US2018/065208, "International Search Report and Written Opinion", Jul. 2, 2019, 12 pages.
PCT/US2019/018552, "International Preliminary Report on Patentability", Sep. 3, 2020, 9 pages.
PCT/US2019/018552, "International Search Report and Written Opinion", May 31, 2019, 12 pages.
PCT/US2019/033148, "International Preliminary Report on Patentability", Dec. 3, 2020, 11 pages.
PCT/US2019/033148, "International Search Report and Written Opinion", Sep. 9, 2019, 14 pages.
PCT/US2019/033394, "International Preliminary Report on Patentability", Dec. 10, 2020, 10 pages.
PCT/US2019/033394, "International Search Report and Written Opinion", Sep. 27, 2019, 14 pages.
PCT/US2019/062557, "International Preliminary Report on Patentability", Jun. 24, 2021, 7 pages.
PCT/US2019/062557, "International Search Report and Written Opinion", Mar. 11, 2020, 10 pages.
Qi et al., "PointNet: Deep Learning on Point Sets for 3D Classification and Segmentation", In The IEEE Conference on Computer Vision and Pattern Recognition (CVPR), Apr. 10, 2017, 19 pages.
Raska et al., "Influence of Augmented Reality on Purchase Intention: The IKEA Case", Jonkoping University, May 2017, 100 pages.
Sairiala , "PBR workflows in Cycles Render Engine : PBR Workflows for Realistic Rendering in Cycles Render Engine", Thesis at Tampere University of Applied Sciences, Degree Programme in Media, 2015, 78 pages.
Sandu et al., "Augmented Reality Uses in Interior Design", Informatica Economica, vol. 22, No. 3, 2018, pp. 5-13.
Shao et al., "An Interactive Approach To Semantic Modeling Of Indoor Scenes With An Rgbd Camera", ACM Transactions On Graphics (TOG) vol. 31, No. 6, 2012, 12 pages.
Siewczyska , "Method for Determining the Parameters of Surface Roughness by Usage of a 3d Scanner". Archives of Civil and Mechanical Engineering, vol. 12, No. 1, 2012, pp. 83-89.
Talmaki et al., "Geospatial Databases and Augmented Reality Visualization for Improving Safety in Urban Excavation Operations", Construction Research Congress: Innovation for Reshaping Construction Practice. Available Online: http://www-personal.umich.edu/~vkamat/documents /Talmaki&Dong&Kamat.CRC.2010.pdf, 2010, pp. 1-10.
Tang et al., "AR Interior Designer: Automatic Fumiture Arrangement Using Spatial and Functional Relationships", International Conference on Virtual Systems & Multimedia (VSMM), Jun. 2015, pp. 345-352.
Unal et al., "Distant Augmented Reality: Bringing A New Dimension to User Experience Using Drones", Digital Applications in Archaeology and Cultural Heritage, vol. 17, 2020, pp. 1-12.
Wang et al., "Material Classification using BRDF Slices", IEEE Conference on Computer Vision and Pattern Recognition (CVPR), 2009, 7 pages.
Wu et al., "Single Image 3d Interpreter Network", European Conference on Computer Vision, Springer International Publishing, 2016, pp. 1-18.
Xiang et al., "Objectnet3d: A Large Scale Database for 3d Object Recognition", European Conference on Computer Vision, Springer International Publishing, 2016, 16 pages.
Yuekang et al., "The Aiming Error Analysis of Machine Vision Based on the Precision of Edge Detection", Institute of Quality and Safety Engineering, China Jillang University, Oct. 10, 2009, pp. 706-709.
Yurieff , "This Shopping App Lets You See a Virtual Couch in Your Real Living Room", CNN Tech, money.cnn.com, May 3, 2017, 3 pages.
Zahavy et al., "Is a Picture Worth a Thousand Words? A Deep Multi-modal Fusion Architecture for Product Classification in E-commerce", arXiv preprint arXiv:1611.09534, 2016, pp. 1-10.
Zeiss, "Accelerating World Wide Initiatives to Map Underground Utilities", Linkedin, Available Online: https://www.linkedin.com/pulse/20140522175912-840956-accelerating-world-wideinitiatives-to-map-underground-utilities, May 22, 2014, 18 pages.
Zeiss, "Major New Initiatives to Enable Mapping Underground Utilities", Available Online: https://www.linkedin.com/pulse/major-new-initiatives-enable-mappingunderground-utilities-zeiss?published=t, Jul. 24, 2017.
Zhang et al., "Active Arrangement of Small Objects in 3D Indoor Scenes", IEEE Transactions on Visualization and Computer Graphics, vol. 27, No. 4, Oct. 25, 2019, pp. 1-16.
Zhao et al., "Image Parsing With Stochastic Scene Grammar", Advances in Neural Information Processing Systems, 2011, pp. 1-9.
Zhao et al., "Scene Parsing by Integrating Function, Geometry and Appearance Models", Proceedings of the IEEE Conference on Computer Vision and Pattern Recognition, 2013, pp. 3119-3126.
U.S. Appl. No. 17/849,544, "Notice of Allowance", Sep. 9, 2024, 8 pages.
CA3,199,122, "Office Action", Sep. 12, 2024, 4 pages.
CA3,199,127, "Office Action", Sep. 11, 2024, 5 pages.
CA3,199,132, "Office Action", Sep. 10, 2024, 5 pages.
"Spacesmart Automated Retail Space Planning Software", Available Online at https://www.impactanalytics.co/solutions/retail-space-and-floor-planning/, Accessed from Internet on Feb. 16, 2023, 4 pages.
"ThincSoft Case Study", Available Online at https://download.oracle.com/otndocs/products/spatial/pdf/osuc2008_presentations/osuc2008_thincsoft.pdf, Accessed from Internet on Feb. 15, 2023, 14 pages.
U.S. Appl. No. 17/849,540 , "Non-Final Office Action", Sep. 21, 2023, 23 pages.
PCT/US2023/068364 , "International Search Report and Written Opinion", Oct. 10, 2023, 10 pages.
PCT/US2023/068367 , "International Search Report and Written Opinion", Oct. 3, 2023, 8 pages.
CA3, 199, 122, "Office Action", Jun. 13, 2025, 5 pages.
CA3, 199, 127, "Office Action", Jun. 27, 2025, 5 pages.
U.S. Appl. No. 17/849,540, titled "Reset Modeling Based On Reset and Object Properties", filed Jun. 24, 2022.
U.S. Appl. No. 17/849,544, titled "Simulated Environment for Presenting Virtual Objects and Virtual Resets", filed Jun. 24, 2022.
U.S. Appl. No. 17/849,540 , "Final Office Action", Dec. 27, 2023, 26 pages.
U.S. Appl. No. 17/849,544 , "Non-Final Office Action", Jan. 5, 2024, 14 pages.
U.S. Appl. No. 17/849,540, "Advisory Action", Aug. 21, 2023, 3 pages.
U.S. Appl. No. 17/849,540, "Final Office Action", Jun. 12, 2023, 20 pages.
U.S. Appl. No. 17/849,540, "Non-Final Office Action", Mar. 2, 2023, 19 pages.
PCT/US2023/068372, "International Search Report and Written Opinion", Jul. 19, 2023, 11 pages.
U.S. Appl. No. 17/849,540, "Advisory Action", Feb. 29, 2024, 4 pages.

* cited by examiner

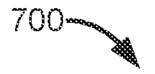

710
STORING A 3D VIRTUAL OBJECT THAT CORRESPONDS TO A REAL-WORLD OBJECT, THE 3D VIRTUAL OBJECT INCLUDING A SUPERIMPOSITION OF AN IMAGE AREA SHOWING A PORTION OF THE REAL-WORLD OBJECT ON A FACE OF A 3D SHAPE

720
STORING A VIRTUAL RESET THAT INCLUDES INFORMATION ABOUT THE 3D VIRTUAL OBJECT AND A POSITION OF THE 3D VIRTUAL OBJECT IN THE VIRTUAL RESET

730
PRESENTING THE VIRTUAL RESET IN AN AUGMENTED REALITY AND/OR VIRTUAL REALITY ENVIRONMENT, THE PRESENTATION SHOWING THE 3D VIRTUAL OBJECT AT THE POSITION

FIG. 7

OBJECT MODELING BASED ON PROPERTIES AND IMAGES OF AN OBJECT

TECHNICAL FIELD

This disclosure generally relates to three-dimensional (3D) modeling in support of virtual and/or augmented reality applications. More specifically, but not by way of limitation, this disclosure relates to 3D modeling of objects and arrangements of such objects for virtual and/or augmented reality applications.

BACKGROUND

Modeling objects for display in computer-based simulated environments (e.g., virtual reality environments and/or augmented reality environments) can be useful for applications in the physical world. For example, virtual models of physical resets (e.g., shelves including stacked or otherwise arranged objects) can be displayed in a virtual reality environment and/or an augmented reality environment to help the viewer assemble the physical resets in a physical environment.

However, conventional virtual modeling systems for creating virtual objects are typically complex, time consuming, rely on special equipment, and may not result in accurate, real-world like virtual objects. For instance, a user may have difficulty identifying a physical object corresponding to a conventionally-generated virtual model when such a model does not provide an adequate visual representation of the physical object. The conventionally-generated virtual model may also not provide physical object specific properties to aid with the identification. Further, the conventional virtual modeling systems permit generation of a virtual model for which a physical object may not feasible to assemble or arrange in the physical world. In some instances, it may be physically impossible to assemble a physical reset according to a virtual model because of weight or dimensional limitations. For example, a shelf in a physical reset may not support a weight of items prescribed in the virtual model to be placed on top of the shelf.

SUMMARY

The present disclosure describes techniques for generating, by a virtual modeling system, virtual models of real-world objects and a virtual reset including an arrangement of such virtual objects.

In certain embodiments, the modeling system receives, via a user interface of a device, a selection of a three-dimensional shape that includes a plurality of faces. The modeling system generates a virtual object by: receiving an image showing a portion of a real-world object, determining an area of the image that corresponds to the portion of the real-world object, associating, in the virtual object, the area of the image with a face of the plurality of faces of the three-dimensional shape, and associating, in the virtual object or in metadata of the virtual object, properties of the three-dimensional shape with the virtual object. The virtual modeling system presents the virtual object in the user interface by at least showing the area of the image superimposed on the face and showing the properties.

In certain embodiments, the modeling system receives, in association with generating a three-dimensional (3D) virtual reset, a selection of a 3D virtual object. The modeling system presents, at a user interface, the 3D virtual object in the 3D virtual reset at a first position. The modeling system receives, via the user interface, an edit to the 3D virtual object in the 3D virtual reset. The modeling system updates the presentation of the 3D virtual reset by showing the edit. The modeling system stores the 3D virtual reset by including, in the 3D virtual reset, information about the 3D virtual object and information about the edit.

In certain embodiments, the modeling system receives, via a user interface of a device, a selection of a three-dimensional shape that includes a plurality of faces. The modeling system generates a virtual object by receiving an image showing a portion of a real-world object, determining an area of the image that corresponds to the portion of the real-world object, associating, in the virtual object, the area of the image with a face of the plurality of faces of the three-dimensional shape, and associating, in the virtual object or in metadata of the virtual object, properties of the three-dimensional shape with the virtual object. The modeling system presents the virtual object in the user interface by at least showing the area of the image superimposed on the face and showing the properties.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 7 depicts a method for rendering a virtual reset in an augmented reality scene, according to certain embodiments disclosed herein.

DETAILED DESCRIPTION

Figure 1:
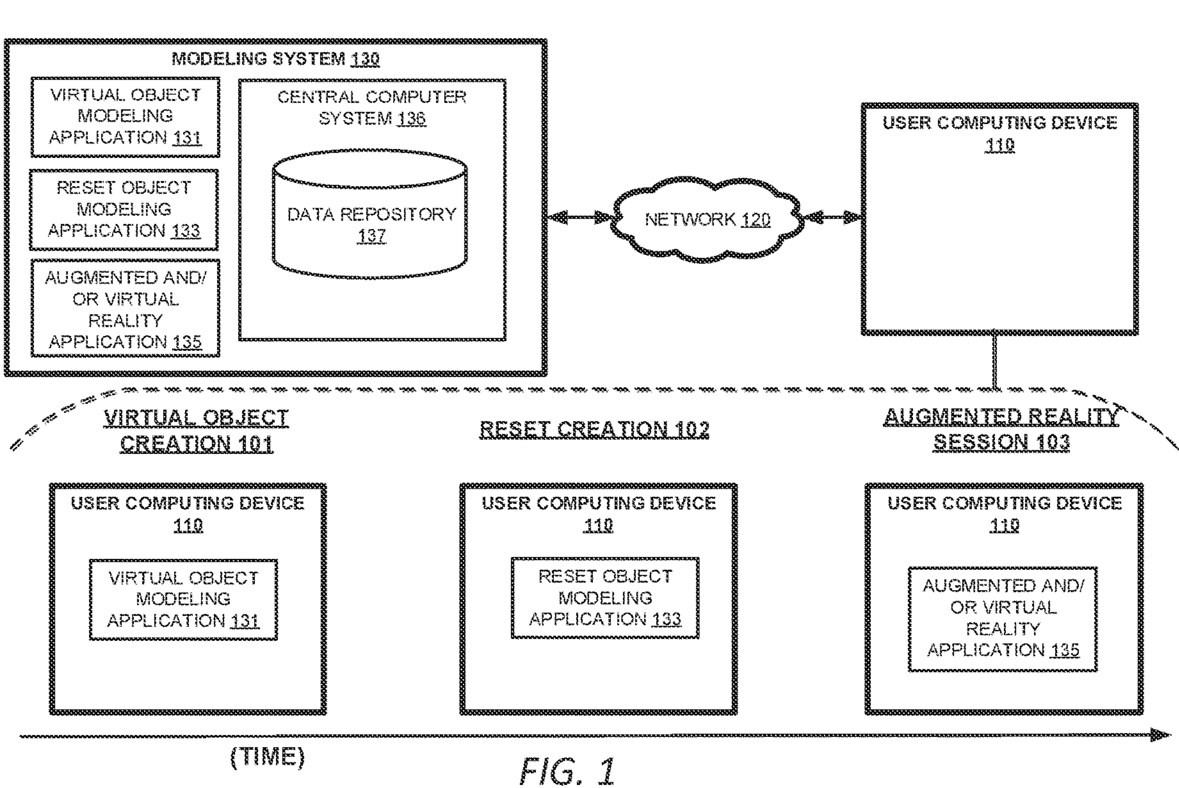
FIG. 1 depicts an example of a computing environment for generating, by a modeling system, virtual objects and virtual resets including such virtual objects in support of a computer-based simulated environment, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

With reference to the embodiments described herein, a computing environment may include a modeling system, which can include a number of computing devices, modeling applications, and a data store. The modeling system may be configured to generate, responsive to inputs received via a user interface, virtual objects corresponding to real-world objects. The modeling system may also be configured to generate a virtual reset, which is a virtual space including an arrangement of virtual objects. The virtual reset can be presented in a computer-based simulated environment, such as in a virtual reality environment and/or an augmented reality environment.

The following non-limiting example is provided to introduce certain embodiments. In this example, a modeling system provides a user interface for creation of virtual objects, creation and editing of virtual resets, and presentation of virtual resets in a computer-based simulated environment. The modeling system can receive, via the user interface, a request to create a virtual object that corresponds to a real-world object. In response, the modeling system can present, via the user interface, a set of three-dimensional (3D) shapes and receive a selection of a shape from the set of shapes for the virtual object. Because the shape is three dimensional, the shape can have multiple faces. The modeling system can also receive, via the user interface, a set of properties of the real-world object to be applied to the virtual object. Properties could include a name, an identifier, a weight, dimensions, a quantity, a price, and/or any other property that can describe an attribute of the real-world object. For example, if the user desires to create a virtual object that models a physical, boxed product, the user can select a 'cuboid' shape and input dimensions corresponding to the dimensions of the physical, boxed product. The modeling system can also request and receive, for each face of the 3D shape, an image that shows a corresponding portion of the real-world object. For example, images of the different sides of the physical, boxed product are generated via a camera and provided to the modeling system that then associates each of these images with the corresponding face of the 3D shape. The modeling system can generate the virtual object based on the 3D shape, the images, and the properties and store the virtual object in a data store.

Subsequently, the modeling system can receive, via a user interface, a request to generate a virtual reset and a selection of one or more virtual objects stored in the data store. The modeling system can present the virtual objects in the virtual reset, allow movement of the virtual objects within the reset (e.g., to change their positions) responsive to inputs received via the user interface, and prohibit positioning or a change to a position based on properties of the virtual objects. For example, the generated virtual object (the boxed product), which is associated with a property of a weight of 20 kilograms, cannot be moved on top of a second virtual object (e.g., a virtual shelf) associated with a property of a weight capacity of 15 kilograms. Accordingly, the modeling system can constrain the generation and editing of virtual resets so that virtual resets generated via the modeling system are physically possible to implement. The modeling system can present, in a virtual and/or augmented reality scene of the user interface, the virtual reset at a location in the virtual and/or augmented reality scene corresponding to a desired physical location of a physical reset modeled by the virtual reset. The modeling system can also present, in the user interface, properties associated with a particular virtual object of the virtual reset responsive to detecting a selection of the virtual object.

The virtual reset can also be stored in the data store (or in another data store). During an augmented reality session, the information about the virtual reset can be retrieved from the data store and used. In particular, the virtual reset can be shown superimposed at the corresponding location in the physical environment.

Generation of virtual objects and resets using the modeling system, as described herein, provides several improvements and benefits over conventional techniques. For example, embodiments of the present disclosure provide a modeling system that enables accurate 3D modeling of real-world objects in accurate manners and without the need for specialized equipment. Such virtual models can be arranged to create virtual resets. Certain embodiments described herein address the limitations of conventional modeling systems by constraining editing operations within a user interface for generating virtual resets that conform to physical constraints of corresponding physical resets. The arrangement of virtual objects within a virtual reset itself can be properly replicated in the physical world. For instance, the modeling system described herein may only allow a set of virtual objects to be stacked on a shelf of the virtual reset if a combined weight of the corresponding real-world objects is less than a load capacity of the corresponding real-world shelf. In another example, the modeling system described herein may allow a virtual object to be placed under a shelf of the virtual reset only if a clearance height under the shelf is greater than or equal to a height of the virtual object. Also, the modeling system described herein enables association of properties information (e.g., height, weight, identifier, name) with virtual objects within the virtual reset during generation of the virtual objects, which conventional systems do not provide, thereby enabling the presentation of object-level properties information during the presentation of the virtual reset in an augmented and/or virtual reality scene.

As used herein, the terms "real-world object," "physical object," or "physical product" are synonymously used and refer to a tangible object that exists in the real-world. This object, in some embodiments, can be a product, a decoration, a support structure (e.g., a shelf, a rack, a stand, etc.), an object attached to another object or support structure (e.g., signage), or any other tangible object.

As used herein, the term "physical reset" refers to an assembly or other arrangement of physical products or other physical objects. For example, a physical reset can be a set of shelves with physical products arranged thereon at a physical location (e.g., at a store).

As used herein, the terms "virtual object" or "three-dimensional (3D) virtual object" refers to a virtual model or a 3D model of a physical object. In certain embodiments, a set of virtual objects can be used to generate a virtual reset within a virtual space.

As used herein, the term "virtual object properties" refer to properties assigned to a virtual object based on properties of the corresponding physical object.

As used herein, the term "virtual shape" refers to a particular property of a virtual object and can be a 3D shape. The virtual shape can be any of a number of predefined shapes including a cube, a rectangular prism (e.g., a cuboid), a sphere, a cylinder, a triangular prism, a pyramid. The virtual shape can be selected to model a shape of the corresponding physical object. For example, a user may select a rectangular prism virtual object to model a boxed physical product.

As used herein, the term "facial image" refers to a property of a virtual object and includes an image to associate with a face of the virtual shape that forms the virtual object. In certain embodiments herein, a user captures, via a camera device, a facial image of each side of the corresponding real-world object and a modeling system imposes or otherwise associates, in the virtual object, each of the facial images with the corresponding face of the virtual shape. In other examples, instead of capturing a facial image via a camera device, a stored image can be used.

As used herein, the term "virtual reset" refers to an arranged set of virtual objects within a virtual space. In some instances, a virtual reset model is a virtual model of a physical reset. A user can construct a virtual reset by selecting one or more virtual objects via a user interface and moving, rotating, stacking, or otherwise manipulating the virtual objects within the virtual space until the virtual reset is constructed. For example, the virtual reset can include a virtual object that models a structural support (e.g., a virtual shelf) with one or more virtual objects representing products (e.g., boxed products) stacked or otherwise arranged thereon.

As used herein, the term "virtual space" or "3D virtual space" refers to a space within which virtual objects can be placed to construct a virtual reset. In some instances, the virtual space can model a corresponding physical space.

As used herein, the term "augmented reality scene" or "virtual reality scene" refers to a scene of a real-world environment in which a virtual reset is overlaid. In certain embodiments, the virtual reset is presented, within the augmented and/or virtual reality scene, at a location that corresponds to a location of a corresponding physical reset to be assembled.

Referring now to the drawings, FIG. 1 depicts an example of a computing environment 100 for generating, by a modeling system 130, virtual objects and virtual resets including such virtual objects in support of a computer-based simulated environment, in accordance with certain embodiments described herein. The modeling system 130 can include one or more processing devices that execute one or more modeling applications. In certain embodiments, the modeling system 130 includes a network server and/or one or more computing devices communicatively coupled via a network 120. The modeling system 130 may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. Based on the present disclosure, one of the ordinary skill in the art would recognize many possible variations, alternatives, and modifications. In some instances, the modeling system 130 provides a service that enables generation of virtual objects based on physical objects, generation and editing of virtual resets, and display of virtual resets in an augmented and/or virtual reality environment for users, for example, including a user associated with a user computing device 110.

In certain embodiments, the modeling system 130 includes a central computer system 136, which supports a plurality of applications, including a virtual object modeling application 131, a reset object modeling application 133, and an augmented and/or virtual reality application 135. The virtual object modeling application 131 is an application that enables users to generate virtual objects. The reset object modeling application 133 is an application that enables users to generate virtual resets that include arrangements of virtual objects. The augmented reality application 135 is an application that enables a presentation of virtual resets in an augmented and/or virtual reality scene. The plurality of applications, including the virtual object modeling application 131, reset object modeling application 133, and the augmented and/or virtual reality application 135 may be accessed by and executed on a user computing device 110 associated with a user of one or more services of the modeling system 130. For example, the user accesses one or more of the applications 131, 133, and 135 via web browser application of the user computing device 110. In other examples, one or more of the applications 131, 133, and 135 is provided by the modeling system 130 for download on the user computing device 110. In some examples, a single application which supports each of the applications 131, 133, and 135 is provided for access by (and execution via) the user computing device 110 or is provided for download by the user computing device 110. As depicted in FIG. 1, the user computing device 110 communicates with the central computer 136 via the network 120. Although a single computing device 110 is illustrated in FIG. 1, each of the applications can be provided to a different computing device.

In certain embodiments, the modeling system 130 comprises a data repository 137. The data repository 137 could include a local or remote data store accessible to the central computer system 136. In some instances, the data repository 137 is configured to store virtual objects and associated properties generated via the virtual object modeling application in a virtual object creation process. In some instances, the data repository 137 is configured to store virtual resets, which define an arrangement of virtual objects arranged in a virtual space, generated via the reset object modeling application 133. In some instances, the data repository 137 is configured to provide virtual objects and/or virtual resets in support of augmented reality scenes generated via the augmented reality application 135. The user computing device 110 also communicates with the data repository 137 via the network 120.

As depicted in FIG. 1, in some examples, the user computing device 110 executes the applications 131, 133, 135 in an order indicated by the timeline depicted in FIG. 1. For example, a user conducts a virtual object creation process using the virtual object modeling application 131 executed on or otherwise accessed via the user computing device 110. After conducting the virtual object creation process, the user conducts a reset creation process using the reset object modeling application 133 executed on or otherwise accessed via the user computing device 110. After conducting the reset creation process, the user initiates an augmented and/or virtual reality session using the augmented and/or virtual reality application 135 executed on or otherwise accessed via the user computing device 110. As explained herein above, a different computing device can be (but does not necessarily need to be) used for some or each of the virtual object creation process, the reset creation process, and the augmented reality session. Additionally, a different user can initiate each application.

Figure 2:
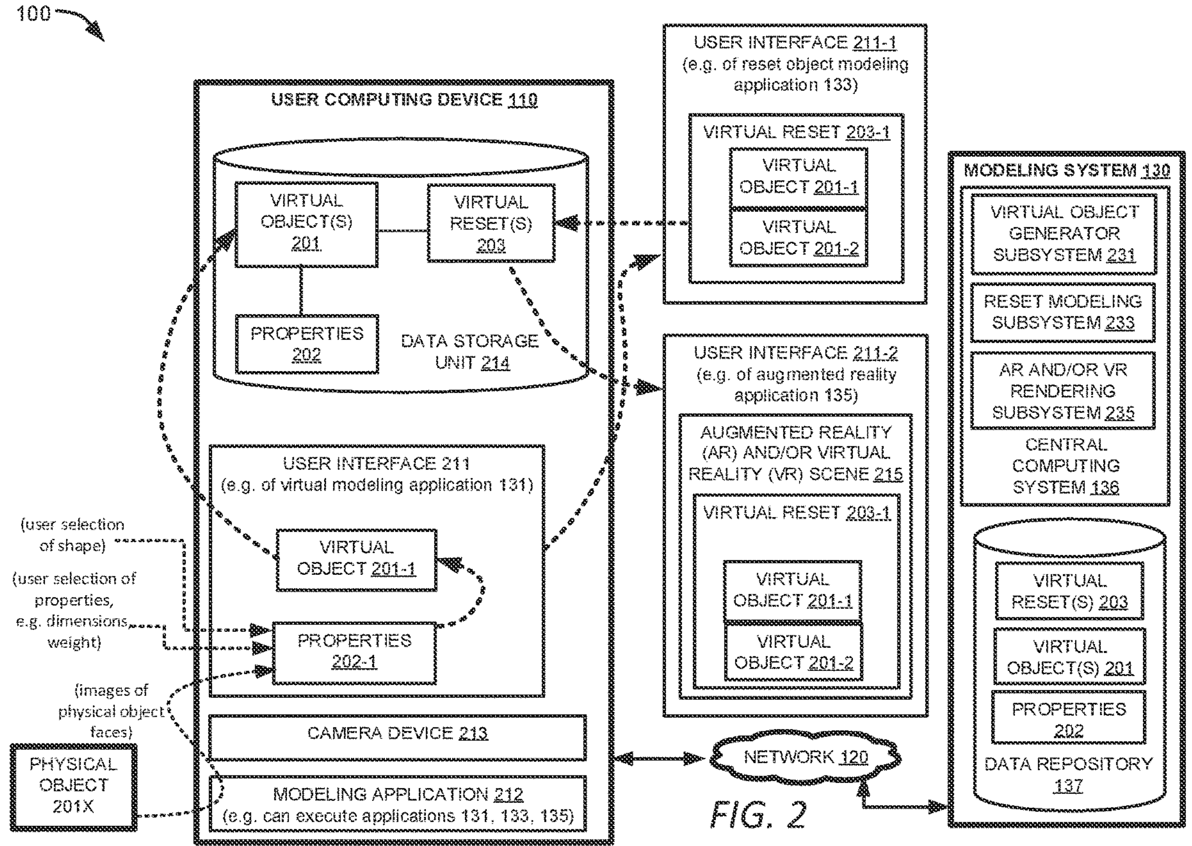
FIG. 2 depicts an example of a computing environment for generating, by a modeling system, a virtual reset including virtual objects which accurately model corresponding physical objects of a physical reset, according to certain embodiments disclosed herein.

FIG. 2 depicts an example of a computing environment 100 for generating, by a modeling system, a virtual reset including virtual objects which accurately model corresponding physical objects of a physical reset, in accordance with certain embodiments described herein.

The computing environment 100 of FIG. 2 provides further details concerning the computing environment 100 of FIG. 1. Elements that are found in FIG. 1 are further described in FIG. 2 and referred thereto using the same element numbers.

The computing environment 100 includes the modeling system 130. The modeling system 130, in certain embodiments, including a virtual object generator subsystem 231, a reset modeling subsystem 233, and an augmented reality (AR) and/or virtual reality (VR) reset rendering subsystem 235.

In certain embodiments, the virtual object generator subsystem 231 is configured to generate, store, and/or render virtual objects 201. In certain examples, the virtual object generator subsystem 231 communicates, via the network 120, with the computing device 110 upon an execution of a modeling application 212 on the computing device 110. The modeling application 212 can include the virtual object modeling application 131. As such, the virtual object generator subsystem 231 can receive, from the computing device 110, a selection of a virtual shape for a virtual object 201, properties 202 for the virtual object 201, and facial images for faces of the virtual shape. The virtual object generator subsystem 231 can generate the virtual object 201 based on the selected virtual shape, the properties 202, and facial images and store the virtual object 201 in a data repository 137. The virtual object generator subsystem 231 can associate, in the data repository 137, the virtual object 201 with its associated shape, facial images, and other properties 202. Additional details about generating a virtual object 201 are provided below, and example illustrations of user interface 211 interactions to generate a virtual object 201 are provided below with respect to FIGS. 4A, 4B, 4C, 4D, and 4E.

In certain embodiments, the reset modeling subsystem 233 is configured to generate, store, and/or render virtual resets 203. In certain examples, the virtual object generator subsystem 231 communicates, via the network 120, with the computing device 110 upon the execution of the modeling application 212. The modeling application 212 can include the reset object modeling application 133. As such, the virtual object generator subsystem 231 can receive, from the computing device 110, a selection of virtual objects 201 and an arrangement of the virtual objects 201 with respect to other virtual objects in a virtual space. The reset modeling subsystem 233 can generate the virtual reset 203 that defines the arrangement of the virtual objects 201 within the virtual space. In some instances, the reset modeling subsystem 233 can store the virtual reset 203 in the data repository 137 including an identity of each virtual object 201 in the virtual reset 203 and a position of each virtual object 203 within the virtual space. Additional details about generating and/or editing a virtual reset 203 are provided below with respect to FIG. 5, and example illustrations of user interface 211 interactions to generate a virtual reset 203 are provided below with respect to FIG. 6.

In certain embodiments, the AR and/or VR reset rendering subsystem 235 is configured to present a selected virtual reset 203 within an AR and/or VR scene 215. In some embodiments, the AR and/or VR reset rendering subsystem 235 is configured to communicate the AR and/or VR scene 215 to the user computing device 110 for presentation via the user interface 211. Additional details about rendering a virtual reset 203 are provided below with respect to FIG. 7, and example illustrations of user interface 211 interactions to render an AR and/or VR scene 215 including a virtual reset 203 are provided below with respect to FIG. 8A and FIG. 8B.

In certain embodiments, the various subsystems (e.g., the virtual object generator subsystem 231, the reset modeling subsystem 233, the AR and/or VR reset rendering subsystem 235) of the modeling system 130 can be implemented as one or more of program code, program code executed by processing hardware (e.g., a programmable logic array, a field-programmable gate array, etc.), firmware, or some combination thereof.

In certain embodiments, one or more processes described herein as being performed by the modeling system 130, or by one or more of the subsystems 231, 233, or 235 thereof, can be performed by the user computing device 110, for example, by the modeling application 212. Accordingly, in certain embodiments, the user computing device 110 can generate a virtual object 201 by performing one or more steps of the method of FIG. 3, can construct and/or modify a virtual reset 203 by performing one or more steps of the method of FIG. 5, and/or can render a virtual reset 203 in an AR and/or VR scene 215 via the user interface 211 by performing one or more steps of the method of FIG. 7 without having to communicate with the modeling system 130 via the network 120.

In certain embodiments, the data repository 137 could include a local or remote data store accessible to the modeling system 130. In some instances, the data repository 137 is configured to store virtual objects 201 and associated properties 202. In some instances, the data repository 137 is configured to store virtual resets 203, which define an arrangement of virtual objects 201 (and associated properties 202) within a virtual space.

The user computing device 110, in certain embodiments, includes a user interface 211, a modeling application 212, a camera device 213, and a data storage unit 214. An operator of the user computing device 110 may be a user of the modeling system 130.

The operator may download the modeling application 212 to the user computing device 110 via a network 120 and/or may start an application session with the modeling system 130. In some instances, the modeling system 130 may provide the modeling application 212 for download via the network 120, for example, directly via a website of the modeling system 130 or via a third-party system (e.g., a service system that provides applications for download).

The user interface 211 enables the user of the user computing device 110 to interact with the modeling application 212 and/or the modeling system 130. The user interface 211 could be provided on a display device (e.g., a display monitor), a touchscreen interface, or other user interface that can present one or more outputs of the modeling application 212 and/or modeling system 130 and receive one or more inputs of the user of the user computing device 110. The user interface 211 can include an augmented reality view which can present virtual resets 203 within an augmented reality (AR) and/or virtual reality (VR) scene 215 such that the virtual reset 203 appears to be displayed within a physical environment of a user when viewed by the user through the user interface 211 in the augmented reality view. In some embodiments, the user interface 211 can include a virtual reality view which can present virtual resets 203 within a virtual reality (VR) scene such that the virtual resets 203 appear to be displayed within the virtual reality scene and wherein the virtual reality scene represents a physical environment (e.g., a retail store) where physical counterparts of the virtual resets 203 can be physically located.

The user computing device 110 modeling application 212, in certain embodiments, is configured to provide, via the user interface 211, an interface for generating and editing virtual objects 201 and virtual resets 203 and for presenting AR and/or VR scenes. The modeling application 212 can include one of, a combination of, or all of the applications 131, 133, and 135.

The camera device 213 can capture one or more facial images of a physical product 201X to be associated with faces of a virtual shape selected for constructing a virtual object 201 that represents the physical object 201X. The camera device 213 is either a component of the user computing device 110 or otherwise is communicatively coupled to the user computing device 110. A camera application of the camera device 213, in some instances, exchanges data (e.g., image data) with the modeling application 212.

In certain embodiments, the data storage unit 214 could include a local or remote data store accessible to the user computing device 110. In some instances, the data storage unit 214 is configured to store virtual objects 201 and associated properties 202. In some instances, the data storage unit 214 is configured to store virtual resets 203, which define an arrangement of virtual objects 201 (and associated properties 202) within a virtual space.

In an example depicted in FIG. 2, the user can use user interface 211 to generate a new virtual object 201-1. For example, the user, via the user computing device 110, accesses or otherwise executes (e.g., via the modeling application 122) the virtual object modeling application 131 to generate the new virtual object 201-1 for a physical object. For example, the user computing device 110 receives, via the user interface 211, properties 202-1 to define a virtual object 201-1. The properties 202-1 include a selection of a shape (e.g., a rectangular prism) for the virtual object 201-1 as well as a definition of other properties 202-1 (e.g., a weight, dimensions, etc.) for the virtual object 201-1. The properties 202-1 further include one or more facial images showing respective one or more sides of the physical object 210X, where each side corresponds to a face of the selected shape. The user may define properties 202-1 via one or more interactions with the user interface 211. For example, the user may select the shape via a drop-down menu or other user interface 211 object that enables the user to select the shape (e.g., the rectangular prism) from among a set of possible shapes (e.g., rectangular prism, cube, sphere, cylinder, pyramid, etc.). In an example, the user may enter other information defining the properties 202-1 for the shape via one or more fields, menus, or other user interface 211 objects. For example, the user may enter a weight, a price, an identifier, one or more dimensions, a name, a quantity, or other properties 202-1 via the user interface 211. In an example, the user may select one or more user interface 211 objects to select a face of the selected shape for the virtual object 201-1 and upload or otherwise capture, for the selected face of the virtual object 201-1, a facial image of a corresponding side of the physical object 201X. The modeling system 130 receives, from the user computing device 110 (e.g., from the modeling application 212) via the network 120, the properties 202-1 that define the virtual object 201-1 and generates the virtual object 201-1 based on the properties 202-1. For example, the virtual object generator subsystem 231 generates a virtual object 201-1 as a rectangular prism having dimensions of 1×1.5×0.5 meters specified by the properties 202-1 and associates other properties 202-1 with the rectangular prism including each facial image to impose or otherwise associate with each face of the rectangular prism as well as data such as a weight, an item identifier, a name, or other information in the properties 202-1 information. The virtual object generator subsystem 231 may store the virtual object 201-1 in the data repository 137 of the modeling system 130 and/or, as depicted in FIG. 2, in the data storage unit 214 of the user computing device 110. One or more steps for generating the virtual object 201-1 in this example described as being performed by the modeling system 130 (or a subsystem thereof) can instead be performed, in certain embodiments, by the computing device 110. In an additional embodiment, not illustrated, one or more of the properties 202 of a virtual object 201 may be derived from the facial images of a physical object. For example, the images of the physical object may also incorporate a scaling object in the frame, such as a ruler, allowing dimensions of the physical object to be attributed to the virtual object 201 without the user having to manually enter the dimensions in the user interface 211.

As depicted in FIG. 2, a user can use an example user interface 211-1 to generate a new virtual reset 203-1 and/or edit an existing virtual reset 203-1. For example, the user, via the user computing device 110, accesses or otherwise executes (e.g., via the modeling application 212) the reset object modeling application 133 to generate the new virtual reset 203-1 and/or edit the existing virtual reset 203-1. For example, the reset modeling subsystem 233 may generate user interface 211-1 which enables construction or editing of virtual resets 203-1. The reset modeling subsystem 233 may receive, in user interface 211-1, a request to generate a new reset 203-1 and a selection of stored virtual object 201-1 and a stored virtual object 201-2. In another example, the user computing device 110 may receive, in the user interface 211-1, a request to access a stored virtual reset 203-1, which includes an arrangement of virtual object 201-1 and virtual object 201-2. The user may arrange and/or rearrange a position, a rotation, or other spatial feature of the virtual objects 201-1 and 201-2 within the virtual space of the virtual reset 203-1 until a desired arrangement of the virtual objects 201-1 and 201-2 is achieved. In certain examples, the reset modeling subsystem 233 moves and/or otherwise rearranges the virtual objects 201 within the virtual reset 203-1 responsive to inputs received at the user interface 211-1. The virtual reset 203-1 shown in FIG. 2 is an example and includes only virtual objects 201-1 and 202-1, however, the virtual reset can include any number of virtual objects 201. In the example depicted in FIG. 2, the virtual object 201-2 could represent a structural support object (e.g., a shelf) and the virtual object 201-1 stacked on top of the structural support object could be a product (e.g., a boxed product). Responsive to receiving a request to save the virtual reset 203-1 (e.g., via selection of a user interface 211 object) the reset modeling subsystem 233 saves the virtual reset 203-1 including the virtual objects 201-1 and 201-2 arranged as instructed via the inputs received via the user interface 211-1 in the data repository 137 and/or, as depicted in FIG. 2, in the data storage unit 214 of the user computing device 110. One or more steps for generating the new virtual reset 203- or editing the existing virtual reset 203-1 described in this example as being performed by the modeling system 130 (or a subsystem thereof) can instead be performed, in certain embodiments, by the computing device 110. In one embodiment, the virtual model object modeling application and reset object modeling application have the ability to periodically save a current state of a virtual object or virtual reset while it is being worked on, in persistent memory to be uploaded when network connectivity is achieved.

As further depicted in FIG. 2, a user can use an example user interface 211-2 to render a virtual reset 203-1 (e.g., the virtual reset generated based on inputs to user interface 211-1) in an AR and/or VR scene 215. For example, the user, via the user computing device 110, accesses or otherwise executes (e.g., via the modeling application 122) the augmented reality and/or virtual reality application 135 to render the virtual reset 203-1 in the AR and/or VR scene 215. In certain examples, the user interface 211-2 is displayed by the user computing device 110 in an augmented reality display mode. In other examples, the user interface 211-2 is displayed via an augmented reality viewing device (e.g., AR glasses, an AR headset, etc.) that is communicatively coupled to one or more of the user computing device 110 and/or the modeling system 130. For example, the AR and/or VR reset rendering subsystem 235 may render the AR and/or VR scene 215 including virtual reset 203-1 within the user interface 211-2 responsive to receiving, via the user interface 211-2, a selection of stored virtual reset 203-1 and a request to render the virtual reset 203-1 in an augmented reality view. The AR and/or VR reset rendering subsystem 235 can access the data repository 137 or, as depicted in FIG. 2, the data storage unit 214 of the user computing device 110 to retrieve the stored virtual reset 203-1. The AR and/or VR reset rendering subsystem 235 renders the AR scene 215 so that the user viewing the user interface 211-2 can view the virtual reset 203-1 in the AR scene 215 in an overlay over the physical environment. An example of a virtual reset displayed in an AR scene 215 is depicted in FIG. 7B. One or more steps for rendering the virtual reset 203-1 in an AR scene 215 described in this example as being performed by the modeling system 130 (or a subsystem thereof) can instead be performed, in certain embodiments, by the computing device 110.

Figure 3:
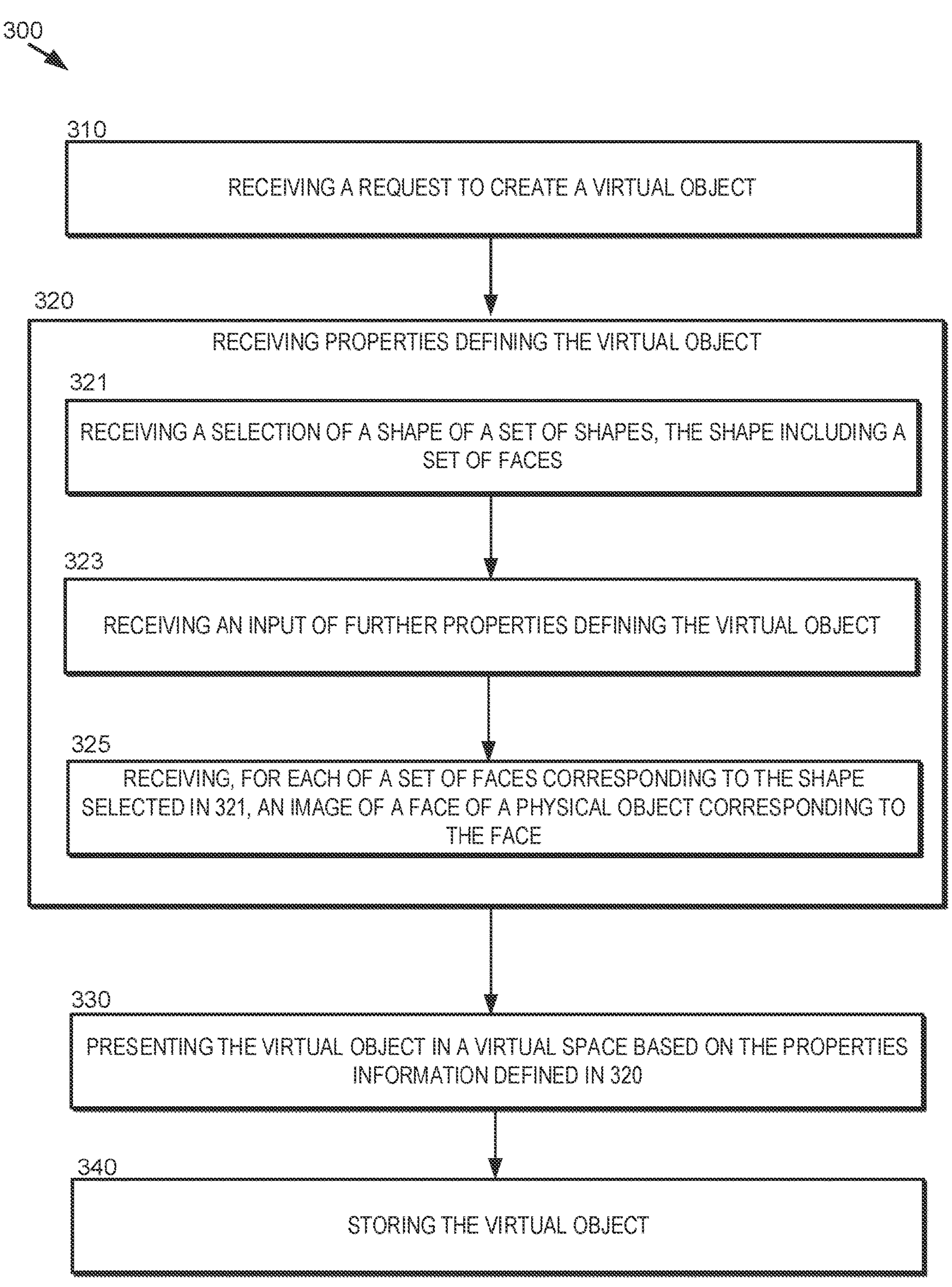
FIG. 3 depicts an example of a method for generating a virtual object, according to certain embodiments disclosed herein.

FIG. 3 depicts an example of a method 300 for generating a virtual object 201, according to certain embodiments disclosed herein. One or more computing devices (e.g., the modeling system 130 or the virtual object generator subsystem 231 included therein) implement operations depicted in FIG. 3. For illustrative purposes, the method 300 is described with reference to certain examples depicted in the figures. Other implementations, however, are possible.

In the example method 300 described herein, the user interacts with a modeling application 212 executing on a computing device 110 via a user interface 211 to provide information as a basis to generate a virtual object 201. In certain embodiments, as described in the following steps of method 300, the modeling system 130 or one or more subsystems thereof performs the steps of method 300 by receiving the information input via the user interface 211 and generating the virtual object 201. However, in other embodiments, the steps of method 300 can be performed by the user computing device 110 without the user computing device 110 needing to communicate with a modeling system 130 via the network 120.

Figures 4A, 4B, 4C:
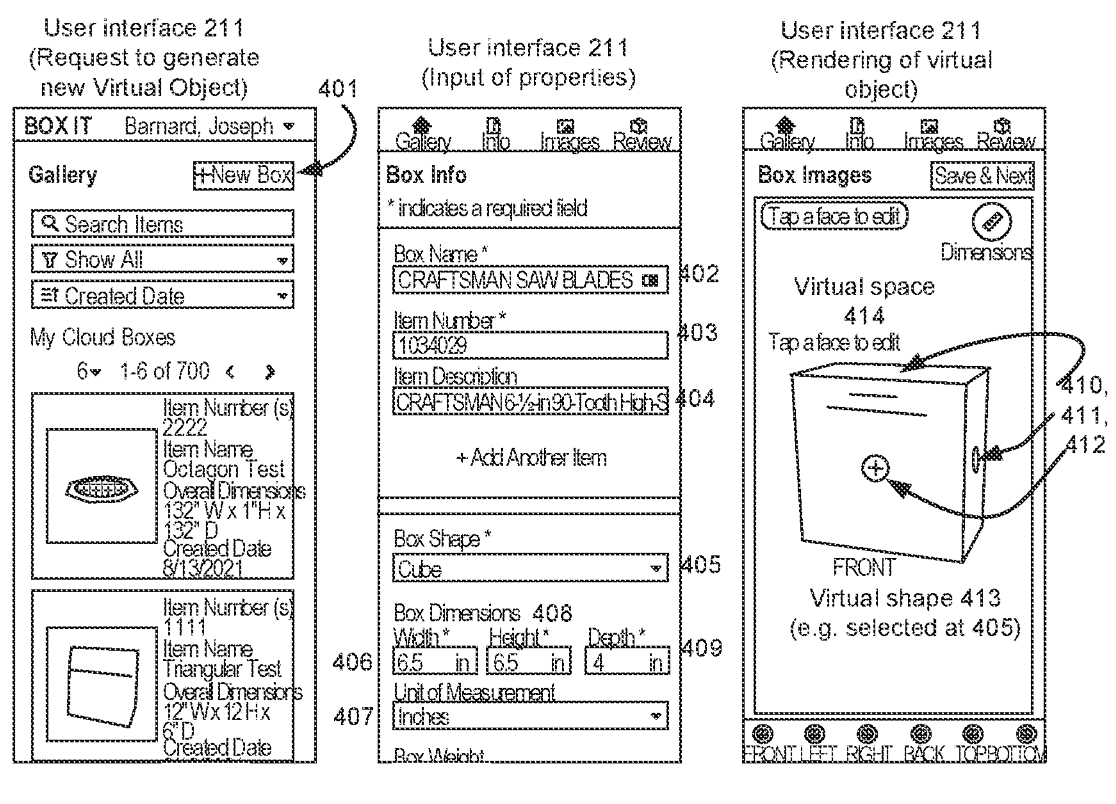
FIG. 4A depicts an illustration of a user interface for generating a virtual object, including requesting a new virtual object, according to certain embodiments disclosed herein.
FIG. 4B depicts an example user interface for receiving properties information defining the virtual object requested in FIG. 4A, including a selection of a shape selected from a set of shapes, according to certain embodiments disclosed herein.
FIG. 4C depicts an illustration of a user interface for receiving properties information defining the virtual object requested in FIG. 4A, including displaying an interface object for selecting a face upon which to impose a facial image, according to certain embodiments disclosed herein.

At block 310, the method 300 involves receiving, by a virtual object generator subsystem 231, a request to create a virtual object 201. In certain embodiments, a user of the user computing device 110 accesses the modeling application 212 via the user interface 211 and interacts therewith to instruct the modeling application 212 to create a new virtual object 201. In some instances, the user wants to generate a virtual object 201 that models a physical object 201X. The virtual object generator subsystem 231 communicates with the user computing device 110 via the network 120 and receives the request to generate the new virtual object 201 responsive to the one or more inputs of the user. FIG. 4A depicts an example user interface 211 for receiving a request to generate a new virtual object 201.

At block 320, the method 300 involves receiving properties 202 information to define the virtual object 201. The virtual object generator subsystem 231 may display, via the user interface 211 and responsive to receiving the request to generate a new virtual object 201, one or more user interface fields to receive properties 202 information to define the new virtual object 201. The user interface 211 fields to receive the properties 202 information can include one or more of drop down menus, check boxes, input fields, an interface object to receive a file upload from the user computing device 110, an interface object to receive an image captured by a camera device 213, or other user interface fields via which property information including one or more of text, files, item selections from a set of items, or other user inputs may be received.

In certain embodiments, the method 300 at block 320 involves implementing blocks 321, 323, and 325, in which the user inputs properties 202 information to define the virtual object 201. For example, the user inputs properties 202 information so that the virtual object 201 models a physical object 201X.

At block 321, the method 300 involves receiving a selection of a shape of a set of shapes, the shape including a set of faces. The virtual object generator subsystem 231 can display one or more user interface 211 objects to receive a selection of a shape. For example, the virtual object generator subsystem 231 can display a drop down menu that enables a selection of a shape from a set of shapes listed in the drop down menu. In another example, the virtual object generator subsystem 231 displays another type of input field to receive the selection of the shape. The set of shapes could include a set of one or more of a cube, a rectangular prism, a cylinder, a pyramid, a cone, a sphere, or other shape. Each shape is associated with a respective set of faces. For example a cube has six faces of equal area. In some instances, the faces comprise a region of surface area. For example, a cylinder could comprise a top circular face, a bottom circular face, and one or more curved portions of surface area around a circumference of the cylinder which runs perpendicular to each of the top and bottom faces. FIG. 4B depicts an example user interface 211 for receiving a selection of a shape selected from a set of shapes.

At block 323, the method 300 involves receiving an input of further properties 202 defining the virtual object 201. The virtual object generator subsystem 231 can display one or more user interface 211 objects to receive a selection and/or other input of further properties 202 (in addition to the shape selection) to define the virtual object 201. In certain examples, the virtual object generator subsystem 231 displays a combined user interface to receive both the selection of the shape as well as the input and/or selection of further properties 202. Further properties 202 can include one or more of a name, an identifier (e.g., an item number), a description, dimensions, weight, or any other property 202 that describes the virtual object 201 such that the virtual object 201 can correspond to the physical object. The user inputs, in some instances, property information that accurately represents the physical object 201X which the user wants to model using the virtual object 201. FIG. 4B depicts an example user interface 211 for receiving properties 202 information to define a virtual object 201.

At block 325, the method 300 involves receiving, for each of a set of faces corresponding to the shape selected in block 321, an image of a portion (e.g., a side, a face, a surface, etc.) of the physical object 201X corresponding to the face. The virtual object generator subsystem 231 may display a user interface 211 via which to receive images of each of a number of faces associated with the shape selected at block 221. For example, a cube comprises six faces and the virtual object generator subsystem 231 could provide a user interface 211 to request and receive images to use for the six faces. Responsive to detecting a click or other interaction with a particular face of the shape, the virtual object generator subsystem 231 can enable a capture, via the camera device 213, of a corresponding facial image of the physical object 201X or enable a selection of a stored image stored on the data storage unit 214 and/or the data repository 137. For example, responsive to an input of the user, the camera device 213 captures an image and transmits the image to the virtual object generator subsystem 231, which associates the captured image with the particular face.

The virtual object generator subsystem 231 may receive a respective facial image for each face of the selected shape. In some embodiments, the virtual object generator subsystem 231 presents a wizard or other program that requests, sequentially, the camera device 213 to capture or upload a respective facial image for each respective face of the selected shape. For example, the virtual object generator subsystem 231 can display, via the user interface 211, a request for a subsequent image corresponding to a subsequent face of the plurality of faces of the 3D shape. The virtual object generator subsystem 231 can receive the subsequent image showing a subsequent portion of the physical object 201X. The virtual object generator subsystem 231 can determine an area of the subsequent image that corresponds to another portion of the physical object 201X. The virtual object generator subsystem 231 can associate, in the virtual object 201, the area of the subsequent image with the subsequent face.

In some embodiments, the virtual object generator subsystem 231 can determine that a face of the set of faces of the selected three-dimensional shape does not have an associated image and, responsive to this determination, display, via the user interface 211, a request for the image, wherein the image is received responsive to requesting the image.

The properties 202 information of the virtual object 201 comprise the received facial images. FIG. 4C depicts an illustration of a user interface for receiving properties information defining the virtual object requested in FIG. 4A, including displaying an interface object for selecting a face upon which to impose a facial image, according to certain embodiments disclosed herein.

In certain embodiments, boundaries of an area of a facial image uploaded or captured by the user computing device 110 do not correspond to boundaries of a face of the virtual object 201. The virtual object generator subsystem 231 may provide one or more user interface objects for performing image manipulations. Image manipulations could include scaled resizing, unscaled resizing, cropping, rotating, warping, or otherwise manipulating the facial image so that boundaries of the facial image are changed. In one embodiment, the user interface provides for the user to zoom in on various portions of the image for finer and more precise control of the image manipulations. The virtual object generator subsystem 231 receives, via the user interface 211 one or more adjustments to the boundaries of the facial image and applies the adjustments to the facial image. After the virtual object generator subsystem 231 has performed one or more adjustments to boundaries of the facial image via requested image manipulations, the virtual object generator subsystem 231 can save a manipulated image responsive to receiving a selection of a user interface object 211 (e.g., the user clicks an interface object entitled "save image"). The virtual object generator subsystem 231 can determine an area of the image that corresponds to the portion of the physical object 201X. The portion can include a side, a surface, a face, or other region of the physical object 201X able to be captured in an image of the physical object 201X. The virtual object generator subsystem 231 can associate, in the virtual object 201, the area of the image with a face of the set of faces of the selected 3D shape.

Figures 4D, 4E:
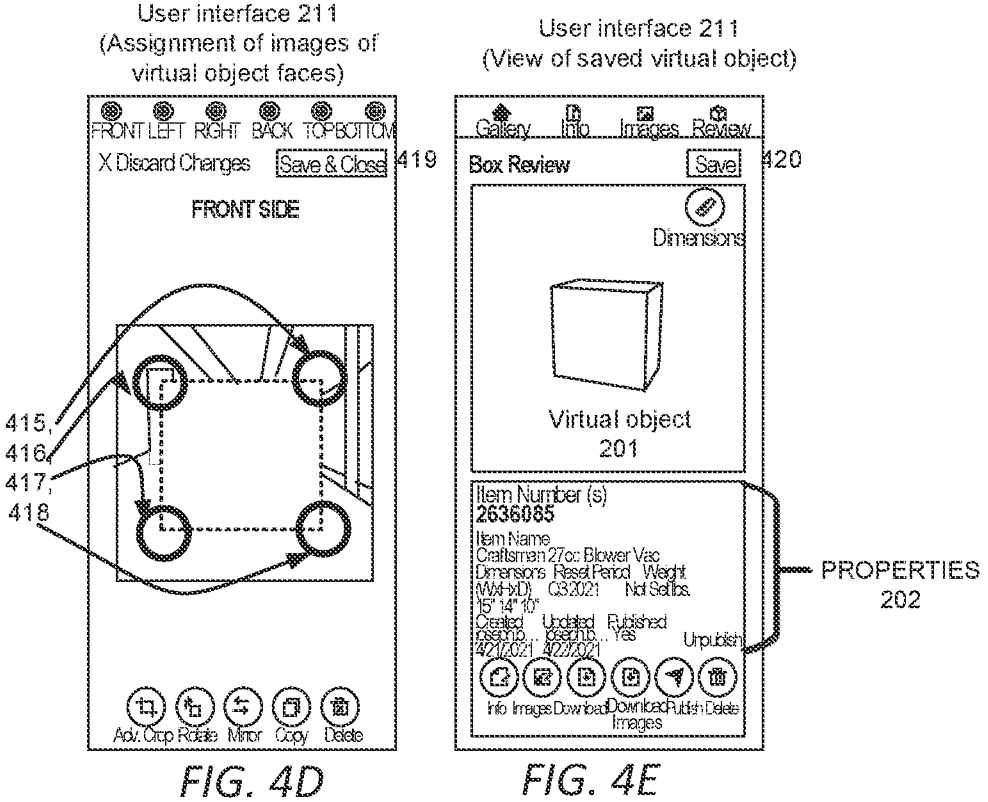
FIG. 4D depicts an illustration of a user interface for generating a virtual object, including a facial image imposed to a face selected via the user interface of FIG. 4C and resizing objects that are selectable to resize an area of the facial image, according to certain embodiments disclosed herein.
FIG. 4E depicts an illustration of a user interface for generating a virtual object, including a display of a virtual object, according to certain embodiments disclosed herein.

In certain examples, the user can resize, edit, rotate, warp, or otherwise manipulate an uploaded or captured image so that boundaries of a portion of the physical object 201X in the image correspond to boundaries of the face of the selected three-dimensional shape. For example, the virtual object generator subsystem 231 can display, via the user interface 211, the image imposed on the face, the image showing, in addition to the portion of the physical object 201X, a portion of a space (e.g., in an environment of the physical object 201X) where the physical object 201X is located. The virtual object generator subsystem 231 can provide, via the user interface 211, resizing objects selectable to enable resizing of the image, wherein the resizing objects are placed on detectable boundaries in the image between the physical object 201X and the space. The virtual object generator subsystem 231 can resize the image to correspond to an area of the face responsive to receiving inputs including a change in position of one or more of the resizing objects. For example, the user can resize the image so that the boundaries of the portion of the physical object 201X in the image correspond to boundaries of the face of the selected three-dimensional shape. In some examples, the virtual object generator subsystem 231 can display, via the user interface 211, a rotation interface object and can rotate, responsive to a manipulation of the rotation interface object, the image so that the boundaries of the portion of the physical object 201X in the image correspond to boundaries of the face of the selected three-dimensional shape. In some examples, the virtual object generator subsystem 231 can display, via the user interface 211, an editing interface object and can edit, responsive to a manipulation of the editing interface object, the image so that the boundaries of the portion of the physical object 201X in the image correspond to boundaries of the face of the selected three-dimensional shape. The editing could include warping, stretching, cropping, or other manipulation of the image. In certain embodiments, the virtual object generator subsystem 231 can display, via the user interface 211, the boundaries of the portion of the physical object 201X in the image and the boundaries of the face of the selected three-dimensional shape to aid the user in manipulating the image using the interface objects. FIG. 4D depicts an illustration of a user interface for generating a virtual object, including a facial image imposed to a face selected via the user interface of FIG. 4C and resizing objects that are selectable to resize an area of the facial image, according to certain embodiments disclosed herein.

At block 330, the method 300 involves presenting the virtual object 201 in a virtual space based on the properties 202 information defined in block 320. For example, the properties 202 information can include the selection in block 321 of the shape from a set of shapes, the input in block 323 of further properties 202 information (e.g., weight, dimensions, identifier, name, price, etc.), and the input in block 325 of facial images for each of a number of faces of the shape selected in block 321. The virtual object generator subsystem 231 can superimpose an image received (and, in some instances, the image is subsequently edited, as described herein) for each face of the shape. Superimposing the image on the face comprises superimposing the portion of the image defined by the boundaries of the physical object 201X in the image onto the face. In certain embodiments, the virtual object generator subsystem 231 can present a preview of the virtual object 201 in the user interface 211 and can allow a rotation of the virtual object to display various views of the virtual object 201.

For example, the item being modeled is a physical box of pool shock and the selected shape is a cube, the dimensions specified are 3 ft×3 ft×3 ft, the name specified is "Merchant X pool shock," the price specified is "$35.00," and the identifier specified is "1268439383." Further, the user uploads an image captures of each of six faces of the physical box of pool shock. The virtual object generator subsystem 231 can display the virtual object 201 that models the box of pool shock including the properties 102 information and can rotate the virtual object 201, responsive to inputs to the user interface 211, to display various views of the virtual object 201. For example, in one view, the user can view three of six faces of the virtual object 201 model of the box of pool shock and, in another view, the user can view a different three of the six faces of the virtual object 201 model.

At block 340, the method 300 involves storing the virtual object 201. The virtual object generator subsystem 231 may associate each of the captured facial images with respective faces of the virtual object 201 so that, when displayed, the modeling system 130 may display the virtual object 201 with the facial images imposed or otherwise displayed on top of the associated faces of the virtual object 201. The virtual object generator subsystem 231 may associate further properties 202 information with the virtual object 201 (e.g., price, name, identifier, description, etc.), for example, in metadata of the virtual object 201. The virtual object 201 may be represented as the shape selected by the user and to scale within the virtual space based on dimensions properties 202 specified by the user. For example, the virtual object generator subsystem 231 can update the 3D shape to include the images (edited as needed) and the remaining properties. Alternatively or additionally, the virtual object generator subsystem 231 stores links between each face and a corresponding image (edited as needed), where the links are to storage location of these images. The remaining properties can be stored in the 3D shape or linked thereto (e.g., stored in metadata that has a storage location link). In an example, responsive to receiving, via the user interface 211, a request to display a stored virtual object 201, the virtual object generator subsystem 231 can retrieve the virtual object 201 from the data repository 137 or from the data storage unit 114. In this example, the virtual object generator subsystem 231 can present the virtual object in the user interface 211, including displaying the 3D shape associated with the virtual object 201 including a quantity of faces and, for each of the quantity of faces, an image superimposed upon the face. In this example, the virtual object generator subsystem 231 can present further properties 202 of the virtual object 201, for example, a name, a price, a weight, an identifier, a description, or other properties 202 information associated with the virtual object 201. In another embodiment, the virtual object generator subsystem 231 may associate an image superimposed upon one or more of the faces of the virtual object, but not every face of the virtual object.

Continuing with the example above with a physical object 201X comprising a box of pool shock, the virtual object 201, when rendered by the modeling system 130, is a realistic representation of the box of pool shock within a virtual space that is to scale and that includes associated properties 202 information that may be retrieved upon a selection of the virtual object 201. FIG. 4E depicts an illustration of a user interface for generating a virtual object, including a display of a virtual object, according to certain embodiments disclosed herein.

FIG. 4A depicts an example user interface 211 for receiving a request to generate a new virtual object 201, in accordance with certain embodiments disclosed herein. The example user interface 211 of FIG. 4A includes a user interface object 401. The modeling system 130 receives a request to generate a new virtual object 201 responsive to the modeling application 212 detecting a selection of the user interface object 401. The user interface 211 of FIG. 4A also depicts further user interface objects for selecting an existing virtual object. For example, a search field that reads "Search items" is depicted in FIG. 4A that enables a user to search and retrieve an existing virtual object 201 that is stored by the modeling system 130.

FIG. 4B depicts an example user interface 211 for receiving properties information defining the virtual object 201 requested in FIG. 4A, including a selection of a shape selected from a set of shapes, in accordance with certain embodiments disclosed herein. As depicted in FIG. 4B, user interface objects 402-409 are displayed and enable an input of properties 202 information defining the virtual object 201. For example, user interface object 402 enables receiving an input of a name, user interface object 403 enables receiving an input of an identifier, user interface object 404 enables receiving an input of a description, user interface object 405 enables selection of a shape from a set of shapes, user interface objects 406, 407, 408, and 409 enable indication of dimensions and a measurement unit for the dimensions. The user interface objects depicted herein are example and additional, less, and/or different interface objects may be displayed to receive properties 202 information from the ones depicted in FIG. 4B. For example, an interface object may be displayed to receive a weight of the virtual object 201 or a price of the virtual object 201. As depicted in FIG. 4B, the user has input values in the interface objects (e.g., objects 402, 403, 404, 406, 408, 409) and/or made a menu selection (e.g., objects 405, 407) to define properties 202 information for the virtual object 201.

FIG. 4C depicts an illustration of a user interface for receiving properties information defining the virtual object requested in FIG. 4A, including displaying an interface object for selecting a face upon which to impose a facial image, according to certain embodiments disclosed herein. As depicted in FIG. 4C, a user interface 211 displays, in a virtual space 414, a virtual shape 413 (a cube) selected by the user using interface object 405 of FIG. 4B. Further the user interface 211 of FIG. 4C depicts a display of interface objects on each side of the shape selected in FIG. 4B. For example, interface objects 410, 411, and 412 are selectable via the user interface 211. Responsive to receiving a selection of one of the interface objects 410, 411, or 412, the modeling system 130 can activate or cause the camera device 213 to enable a user to capture a facial image of a corresponding face of a physical object 201X or can display one or more user interface objects that enable the user to access an image file to upload as the facial image.

FIG. 4D depicts an illustration of a user interface for generating a virtual object, including a facial image imposed to a face selected via the user interface of FIG. 4C and resizing objects that are selectable to resize an area of the facial image, according to certain embodiments disclosed herein. As depicted in FIG. 4D, an image is superimposed over a face of a virtual object. User interface objects 415, 416, 417, and 418 are provided at each of four corners of the facial image and enable, via selection and/or dragging of the user interface objects 415, 416, 417, and 418, the virtual object generator subsystem 231 to change one or more boundaries of the facial image with respect to the face of the virtual object 201. User interface object 419 enables saving of the modified facial image subsequent to application of image modification operations instructed via interface objects 415, 416, 417, and 418. The user interface objects depicted in FIG. 4D are example and other types of user interface 211 objects may be used to perform additional or different facial image manipulations.

FIG. 4E depicts an illustration of a user interface for generating a virtual object, including a display of a virtual object, according to certain embodiments disclosed herein. FIG. 4E depicts a rendering, within a virtual space, a virtual object 201 and associated properties 202 information generated based on inputs received via user interfaces in FIG. 4A, FIG. 4B, FIG. 4C, and FIG. 4D. As shown in FIG. 4E, the rendered virtual object 201 includes facial images provided by the user (e.g., captured directly from the physical object 201X or otherwise uploaded) superimposed upon faces of the virtual object 201. As shown in FIG. 4E, a properties 202 information section below the rendered virtual object 201 includes properties 202 specified by the user. FIG. 4E further depicts a user interface object 420, selection of user interface object 420 causing the virtual object generator subsystem 231 to store the virtual object 201 on the data repository 137 and/or the data storage unit 214 of the user computing device 110. In the example depicted in FIG. 4E, the stored virtual object 201 includes the properties 202 information (e.g., shape, further properties information, facial images) provided by the user via the user interfaces of FIGS. 4A, 4B, 4C, and 4D.

Figure 5:
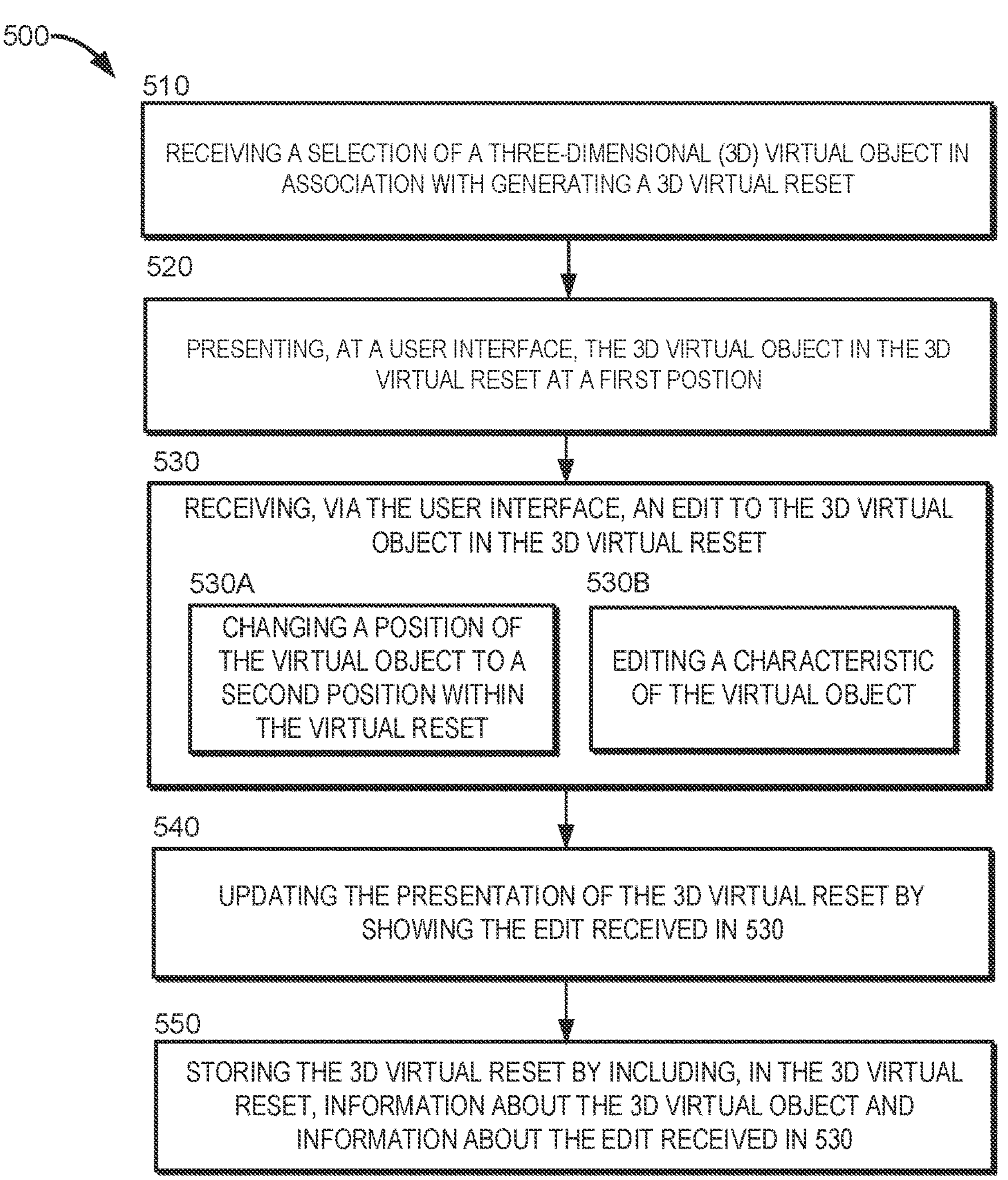
FIG. 5 depicts an illustration of a method for generating a virtual reset, according to certain embodiments disclosed herein.

FIG. 5 depicts a method 500 for generating a virtual reset, according to certain embodiments disclosed herein. One or more computing devices (e.g., the modeling system 130 and/or the reset modeling subsystem 233) implement operations depicted in FIG. 5. For illustrative purposes, the method 500 is described with reference to certain examples depicted in the figures. Other implementations, however, are possible.

In certain embodiments, the method 500 begins at block 510. At block 510, the method 500 involves receiving, by a reset modeling subsystem 233, a selection of a 3D virtual object 201 in association with generating a 3D virtual reset 203. In an example, the reset modeling subsystem 233 receives a request to generate a new virtual reset 203 from the reset object modeling application 133 executing on the user computing device 110 responsive to receiving one or more inputs to the user interface 211. The reset object modeling application 133 receives a selection of at least one virtual object 201 to include within the virtual reset 103. For example, the user of the user computing device 110 accesses the reset object modeling application 133 (e.g., via the application 112), selects an option to generate a new virtual reset 203, and selects at least one virtual object 201 to include within the virtual reset 103. The reset modeling subsystem 233, via the reset object modeling application 133, may provide menus, fields, or other user interface 211 objects to enable the user to request the new virtual reset 203 and select the at least one virtual object for inclusion within the new virtual reset 203.

In certain embodiments, instead of generating a new virtual reset 203, the user retrieves a stored virtual reset 203. For example, the reset modeling subsystem 233 receives a request to retrieve a stored virtual reset 203 from the reset object modeling application 133 executing on the user computing device 110 responsive to receiving one or more inputs to the user interface 211. The reset object modeling application 133 can access a selected stored virtual reset 203 from the data repository 137 of the modeling system 130 or from the data storage unit 214 of the user computing device 110. For example, the user of the user computing device 110 accesses the reset object modeling application 133 (e.g., via the application 112), selects an option to retrieve a stored virtual reset 203, and selects the stored virtual reset 203 from a list of stored virtual resets 203. The reset modeling subsystem 233, via the reset object modeling application 133, may provide menus, fields, or other user interface 211 objects to enable the user to request the stored virtual reset 203. The stored virtual reset 203 includes at least one virtual object 201.

At block 520, the method 500 involves presenting, by the reset modeling subsystem 233 at the user interface 211, the 3D virtual object 201 in the 3D virtual reset 203 at a first position. The new virtual reset 201 or the stored virtual reset 201 includes at least one virtual object 201 arranged in a virtual space at the first position within the virtual reset 203. The virtual reset 203 may include, in some instances, multiple virtual objects 201 at respective positions within the virtual reset 203. For example, the virtual reset 203 can include first, second, third, or subsequent virtual objects 201 within the virtual reset 203 at first, second, third, or subsequent respective positions within a virtual space within the virtual reset 203.

Figure 6:
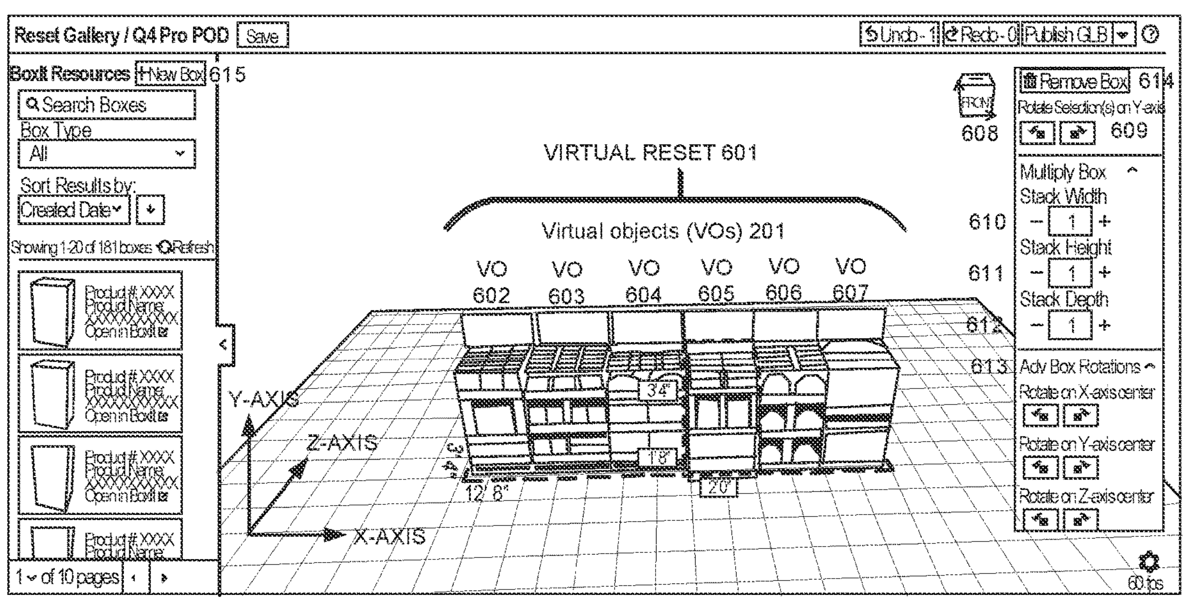
FIG. 6 depicts an illustration of a user interface tool for applying edits to a virtual reset which can be used with the method of FIG. 5, according to certain embodiments disclosed herein.

At block 530, the method 500 involves receiving, by the reset modeling subsystem 233 via the user interface 211, an edit to the 3D virtual object 201 in the 3D virtual reset 203. The reset object modeling application 133 may provide a user interface 211 which the user can visualize edits as well as tools via which the user can apply edits to the virtual objects 203 of the virtual reset 203. For example, a position tool enables a user to select the virtual object 201 and change a position of the virtual object 201 within the virtual reset 203. A rotation tool enables a user to select the virtual object 201 and rotate the virtual object 201. FIG. 6 depicts an illustration of a user interface 211 tool for applying edits to a virtual reset 203 which can be used with the method 500 of FIG. 5, according to certain embodiments disclosed herein.

In certain embodiments, implementing block 530 comprises performing one or more iterations of one or more of block 530A or block 530B. For example, block 530A can be repeated multiple times to receive edits including changes in position for one or more virtual objects 201 in the virtual reset 203. Block 530B can be repeated multiple times to receive edits including changes to characteristics of one or more virtual objects 201 in the virtual reset 203. The reset modeling subsystem 233 receives the edits requested by the user via the reset object modeling application 133.

At block 530A, the method 500 involves receiving, by the reset modeling subsystem 233, an edit that includes changing a position of the virtual object 201 to a second position within the virtual reset 203. In some instances, a virtual reset models a corresponding physical reset and a user of the user computing device 110 (e.g., a reset designer), as part of a process of designing a virtual reset 203 corresponding to the physical reset, interacts with the reset object modeling application 133 to change a position of the virtual object from a first position to a second position within the virtual reset 203. Changing the position can include moving, rotating, stacking, or otherwise manipulating the virtual object 203 within the virtual space of the virtual reset 203. For example, the first position can include a first location (e.g., within an x, y, z coordinate system within a virtual space) and a first orientation (e.g., default configuration) and the second position can include a second location and a second orientation (e.g., rotated 90 degrees about the y axis). The user may use the reset object modeling application 133 to construct a virtual reset 203 that accurately models a physical reset. For example, the virtual reset 203 can include a virtual object 201 that models a structural support (e.g., a virtual shelf) with one or more other virtual objects 201 representing products (e.g., boxed products), signage (a sign that can be placed on or otherwise attached to a surface of the structural support), or other objects. The user may move, within the virtual reset 203, the structural support to a desired position and orientation, move and/or orient one or more of the products to stack or otherwise arrange the products on the structural support, and move and/or orient the signage to place the signage at desired location(s) on the structural support. For example, a first virtual object 201 has first boundaries, a second virtual object 201 has second boundaries, and the edit includes a request to move the first virtual object 201 so that the first virtual object 201 is stacked on or beside and against (e.g., packed tightly next to) the second virtual object 201. For example, the edit instructs moving the first virtual object 201 so that a first portion of the first boundaries of the first 3D virtual object is adjacent to a second portion of the second boundaries of the second 3D virtual object.

At block 530B, the method 500 involves receiving, by the reset modeling subsystem 233, an edit that includes editing a characteristic of the virtual object 201. For example, the characteristic can include images associated with one or more faces of the 3D virtual object 201 and editing the characteristic can include changing one or more of the images. In some instances, the characteristic can include properties 202, such as dimensions of the virtual object 201, and editing the characteristic can include resizing or otherwise changing the dimensions. In some instances, editing the characteristic of the virtual object 201 comprises duplicating the virtual object 201 within the virtual reset 203. In some instances, instead of and/or in addition to editing a characteristic of the virtual object 201, the user adds a new virtual object 201 to the virtual reset and/or deletes one or more virtual objects 201 from the virtual reset 203.

From block 530, the method 500 proceeds to block 540.

At block 540, the method 500 involves updating, by the reset modeling subsystem 233, the presentation of the 3D virtual reset 203 by showing the edit received in block 530. For example, the reset modeling subsystem 233 displays, in the user interface 211, the virtual object 201 in a second position responsive to receiving the edit instructing to move the virtual object 201 from a first position to the second position. The reset modeling subsystem 233 can present a rotation of the virtual object 201, a change in position of the virtual object 201, a change in one or more images of faces of the virtual object 201, a resizing or other change in dimensions of the virtual object 201, a duplication of the virtual object 201, or other edits to the virtual object 201. In some instances, the reset modeling subsystem 233 can present, via the user interface 211, an addition of a virtual object 201 and a deletion of a virtual object 201 in the virtual reset 203. FIG. 6 depicts an illustration of a user interface 211 tool for applying edits to a virtual reset 203 which can be used with the method 500 of FIG. 5, according to certain embodiments disclosed herein. In some embodiments, block 530 and block 540 can be repeated, allowing the user, for example, to change the position of the virtual object in the virtual reset after seeing the virtual object's position in the virtual reset.

In some embodiments, the reset modeling subsystem 233 can constrain editing operations with respect to the virtual reset 203.

In some embodiments, editing operations are constrained based on a weight capacity property 202 and/or weight property 202 of virtual objects 201 within the virtual reset 203. In an example, a first virtual object 201 is a boxed product having a weight of 200 kg and a second virtual object 201 is a shelf having a weight capacity of 100 kg. In this example, the reset modeling subsystem 233 receives an edit requesting a change in position of the first virtual object 201 such that it is stacked on top of the second virtual object 201. In this example, the reset modeling subsystem 233 determines that a weight of the first virtual object 201 (200 kg) is greater than the weight capacity of the second virtual object (100 kg) upon which the first virtual object 201 is to be stacked. In this example, responsive to determining that the weight capacity does not enable the requested stacking editing operation, the reset modeling subsystem 233 denies and reverses the editing operation. In this example, the reset modeling subsystem 233 may indicate, via the user interface 211, that the editing operation is not allowed and may display a reason or reason code to the user (e.g., "selected object is too heavy to stack on this shelf."). Reversing the editing operation can include returning the virtual object 201 from the requested second position (e.g., the position in which it is stacked on the shelf) to its original first position within the virtual reset 203. In certain examples, the reset modeling subsystem 233 can deny and reverse a requested editing operation based on a weight capacity of a structural support virtual object 201 in view of a combined weight of multiple virtual objects 201 stacked upon the structural support virtual object 201. For example, the weight capacity of the structural support virtual object 201 is 100 kg, a first virtual object 201 stacked on the structural support virtual object 201 is 60 kg, and the reset modeling subsystem 233 receives a request to stack an additional virtual object 201 having a weight property 202 of 50 kg upon the structural support object 201. In this example, responsive to determining that a combined weight of 110 kg is greater than the weight capacity of 100 kg, the reset modeling subsystem 233 does not allow the edit and reverses the edit.

In some embodiments, editing operations are constrained based on dimension properties 202 and/or clearances (e.g., height/length/width clearances) between virtual objects 201 within the virtual reset 203. In an example, a first virtual object 201 is a first shelf object, a second virtual object 201 is a second shelf object that is 3 ft above the first shelf object within the virtual reset 203, and a third virtual object is a boxed product having a height of 3.5 ft. In this example, the reset modeling subsystem 233 receives an edit requesting a change in position of the third virtual object 201 such that it is placed above the first shelf and below the second shelf within the virtual reset 203. In this example, the reset modeling subsystem 233 determines that a height clearance (3 ft) between the shelves is less than a height (3.5 ft) of the third virtual object 201 which the edit specifies to place between the shelves. In this example, responsive to determining that the height clearance does not enable the requested editing operation, the reset modeling subsystem 233 denies and reverses the editing operation. In this example, the reset modeling subsystem 233 may indicate, via the user interface 211, that the editing operation is not allowed and may display a reason or reason code to the user (e.g., "selected object is too tall/wide/long to stack in this location."). Reversing the editing operation can include returning the third virtual object 201 from the requested second position (e.g., the position in which it is stacked between the shelves) to its original first position within the virtual reset 203.

In certain embodiments, the reset modeling subsystem 233 can indicate, via the user interface 211, where a virtual object 211 can or cannot be repositioned based on weight and clearance constraints of virtual objects 201 within the virtual reset 203. For example, the reset modeling subsystem 233 can determine, responsive to a selection of a virtual object 201, a set of possible locations within the virtual reset 203 where the virtual object 201 can be moved without violating one or more constraints associated with weight capacity and/or clearances and can indicate the locations in the user interface 211. In another example, the rest modeling system can determine, responsive to a selection of a virtual object 201, a set of possible locations within the virtual reset 203 where the virtual object 201 cannot be moved without violating one or more constraints associated with weight capacity and/or clearances and can indicate the locations in the user interface 211.

At block 550, the method 500 involves storing, by the reset modeling subsystem 233, the 3D virtual reset 203 by including, in the 3D virtual reset, information about the 3D virtual object 201 and information about the edit received in block 530. In some instances, the reset modeling subsystem 233 can store an edited virtual object 201 and/or an edit at a storage location in a data storage unit (e.g., data repository 137 and/or data storage unit 214), including storing information about the virtual object 201 and information about the edit. The stored edit virtual object 201 could include the edited virtual object itself or a link to the storage location of the edited virtual object 201. The stored edit could include the edit itself or a link to the storage location of the edit. In some instances, the reset modeling subsystem 233 can store, for multiple edited virtual objects 201 and/or edits in a virtual reset 203, edited virtual objects 201 and/or an edits at respective storage locations in the data storage unit, including storing information about the respective virtual objects 201 and/or information about the respective edits.

In certain examples, responsive to receiving a request to present the stored virtual reset 203 stored in block 550, the reset modeling subsystem 233 can display, via the user interface 211, the virtual reset 203 in an augmented reality user interface 211. The reset modeling subsystem 233, responsive to receiving a selection of a virtual object 201 of the virtual reset 203, can display properties 202 information associated with the virtual object 201 of the virtual reset 203. For example, associated property 202 information could be associated in metadata of the virtual object 201 and could include a weight, dimensions, brand information, a price, an item identifier, or other property. In some examples, the virtual object 201 could be signage and displaying the virtual reset 203 in the augmented reality environment includes presenting the signage. FIG. 7 depicts a method for rendering a reset in an augmented reality scene, according to certain embodiments disclosed herein.

FIG. 6 depicts an illustration of a user interface 211 tool for applying edits to a virtual reset 203, which can be used with the method 500 of FIG. 5, according to certain embodiments disclosed herein. FIG. 6 depicts a view of a user interface 211-1 for generating and/or editing a virtual reset 203 using the reset object modeling application 133. A depicted virtual reset 601 includes the following virtual objects 201: VO 602, VO 603, VO 604, VO 605, VO 606, and VO 607. As depicted in FIG. 6, VO 605 has been selected by the user. The user interface 211-1 includes tools for editing the selected VO 605. For example, user interface 211 objects 608 and 609 enable rotation of the selected VO 605 in a counterclockwise or clockwise direction, respectively. User interface 211 objects 610, 611, and 612 enable duplication of the selected VO 605 via duplication in a horizontal direction ("stack width"), in a vertical direction ("stack height"), or in a direction behind ("stack depth") the selected VO 605. User interface 211 objects 613 enable further rotation operations, for example, via an x-axis, y-axis, or z-axis. User interface 211 objects 614 enables deletion of the selected VO 605. User interface 211 object 615 enables addition of an additional virtual object 201 to the virtual reset 601. The tools depicted in FIG. 6 are examples and further tools could be added or different tools may be displayed. For example, a tool for moving the selected VO 605 from its current depicted position to a subsequent position could be provided.

FIG. 7 depicts a method for rendering a virtual reset in an augmented reality scene, according to certain embodiments disclosed herein. One or more computing devices (e.g., the modeling system 130 or the AR and/or VR reset rendering subsystem 235) implement operations depicted in FIG. 7. For illustrative purposes, the method 700 is described with reference to certain examples depicted in the figures. Other implementations, however, are possible.

At block 710, the method 700 involves storing, by the modeling system 130, a 3D virtual object 201 that corresponds to a real-world object 201X, the 3D virtual object 201 including a superimposition of an image area showing a portion of the real-world object 201X on a face of a 3D shape. The 3D virtual object 201 can be defined per the method 300 of FIG. 3. In some instances, the virtual object generator subsystem 231 receives, via the user interface 211, a selection of a 3D shape (e.g., a cube), from a plurality of shapes (e.g., a cube, a rectangular prism, a cylinder, a sphere, a spheroid, a cone, a pyramid, etc.) that includes a plurality of faces including the face. The virtual object generator subsystem 231 further receives a selection of the face and an image to superimpose on the face showing a portion of the real-world object 201X. The virtual object generator subsystem 231 can determine an area of the image that corresponds to the portion of the real-world object and associate the area of the image with the face. The virtual object generator subsystem 231 can receive an input indicating further properties 102 for the 3D shape, for example, dimensions and/or a weight to associate with the virtual object 201. The virtual object generator subsystem 231 can associate properties 202 information with the virtual object including the selected 3D shape, the associated area of the image (for the face), and the input further properties 202 for the 3D shape. The properties 202 information can be included in the virtual object 201 or in metadata of the virtual object 201. In certain examples, associating the area of the image with the selected face of the 3D shape can include presenting the image imposed on the selected face and providing an editing interface object so that a user can change boundaries of the portion of the real-world object 201X to correspond with boundaries of the face. Further details about generating a virtual object 201 are described in FIG. 3 and FIGS. 4A, 4B, 4C, 4D, and 4E.

At block 720, the method 700 involves storing, by the modeling system, a virtual reset 203 that includes information about the 3D virtual object 201 and a position of the 3D virtual object 201 in the virtual reset 203. The virtual reset 203 can be defined per the method 500 of FIG. 5. In some instances, generating the 3D virtual reset can include presenting, at the user interface 211, the virtual object 201 in the virtual object 203 at a first position, receiving an edit to the virtual object 201 in the virtual reset 203, and updating the presentation of the virtual reset 203 by showing the edit, and storing the virtual reset 203 by including information about the virtual object 201 and information about the edit in the virtual reset 203. The information about the virtual object 201 can include the virtual object 201 itself or a link to the virtual object 201. In some instances, the edit to the virtual object 201 could include a change in position of the virtual object 201 from a first position to a second position. In some instances, the edit to the virtual object 201 could include a rotation of the virtual object 201. In some instances, the edit to the virtual object 201 includes a change to images of one or more of the faces of the virtual object 201. In some instances, the edit to the virtual object 201 includes a resizing or other change in dimensions of the virtual object 201. The reset modeling subsystem 233 can store the edited virtual object 201 at a storage location in a data storage unit, including the information about the virtual object 201 and/or the information about the edit. In some instances, the information about the virtual object 201 and the information about the edit can include the edited virtual object 201 or a link to the storage location of the edited virtual object 201. In some instances, the information about the virtual object 201 includes the virtual object 201 or a link to the virtual object 201 and the information about the edit includes the edit or a link to the storage location of the edit. Further examples of generating and/or editing a virtual reset 203 are described herein in FIG. 5 and FIG. 6.

At block 730, the method 700 involves presenting, by the modeling system, the virtual reset 203 in an augmented reality and/or virtual reality environment, the presentation showing the 3D virtual object 201 at the position. In certain embodiments, the user interface 211 can include an augmented reality view which can display virtual resets 203 within an augmented reality (AR) and/or virtual reality (VR) scene 215 such that the virtual reset 203 appears to be displayed within a physical environment of a user when viewed by user through the user interface 211 in the augmented reality view. In certain embodiments, the AR and/or VR reset rendering subsystem 235 moves the virtual reset 203 within the augmented reality environment, responsive to receiving an input in the augmented reality environment, so that a location within the augmented reality environment of the virtual reset 203 corresponds to a physical location in a physical environment of a physical reset to be assembled. In some instances, the user uses the displayed virtual reset 203, which includes an arrangement of virtual object 201 in virtual space, as a guide to assemble a corresponding physical reset which includes a like arrangement of physical objects 201X in a physical environment of the user. The reset modeling subsystem 233, responsive to receiving a selection of a virtual object 201 of the virtual reset 203, can display properties 202 information associated with the virtual object 201 of the virtual reset 203 within the augmented reality view. For example, associated property 202 information could be associated in metadata of the virtual object 201 and could include a weight, dimensions, brand information, a price, an item identifier, object material, restrictions on placement, or other property 202.

Figure 8A:
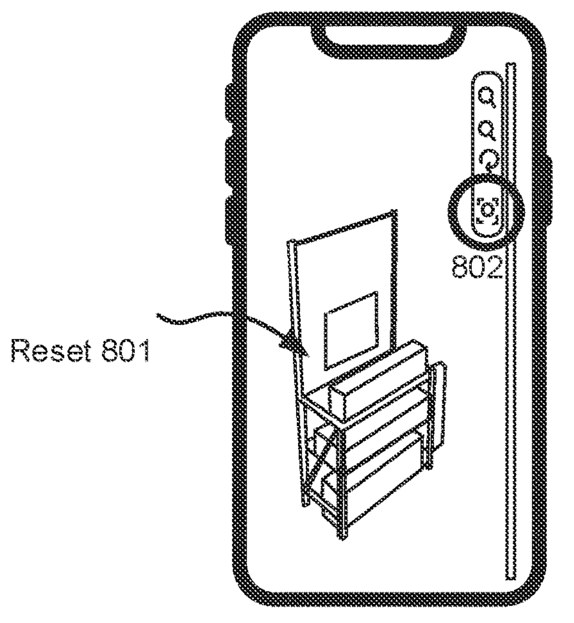
FIG. 8A depicts an illustration of a user interface for instructing a computing system to display a virtual reset within an augmented reality scene, according to certain embodiments disclosed herein.

FIG. 8A depicts an illustration of a user interface 211 for instructing a display of a virtual reset 203 within an augmented reality scene 215, according to certain embodiments disclosed herein. FIG. 8A depicts a user interface 211-1 display of a reset 801. The user interface 211-1 includes a user interface object 802 for enabling display of an augmented reality view of the reset 801 as depicted in FIG. 8B.

Figure 8B:
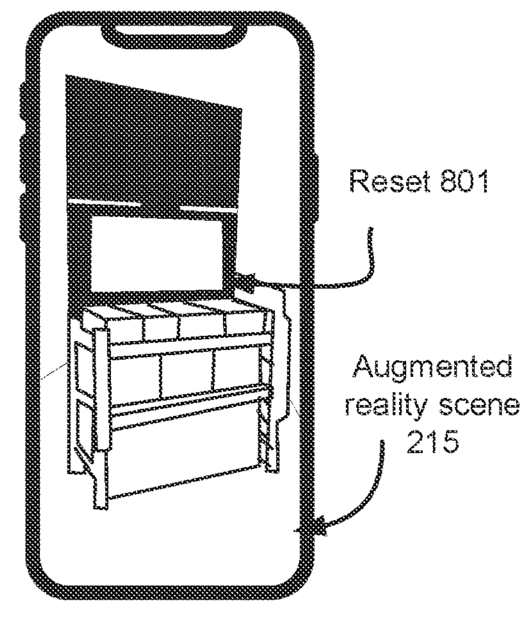
FIG. 8B depicts an illustration of a user interface for viewing the display of the virtual reset of FIG. 8A within an augmented reality scene, according to certain embodiments disclosed herein.

FIG. 8B depicts an illustration of a user interface 211 for viewing the display of the virtual reset 203 of FIG. 8A within an augmented reality scene 215, according to certain embodiments disclosed herein. For example, the user interface 211-2 of FIG. 8B is displayed responsive to detecting a selection of user interface 802 of FIG. 8A, which requested display of the reset 801 in the augmented reality view. FIG. 8B depicts an augmented reality scene 215 which includes the displayed reset 801.

In other embodiments, the virtual objects and virtual resets described herein as well as the methods to create the virtual objects and virtual resets described herein can be utilized outside of a virtual or augmented reality environment. In one embodiment, a virtual object and/or virtual reset may simply be presented as an image or a rotatable 3D object, independent of an virtual or augmented reality environment.

Figure 9:
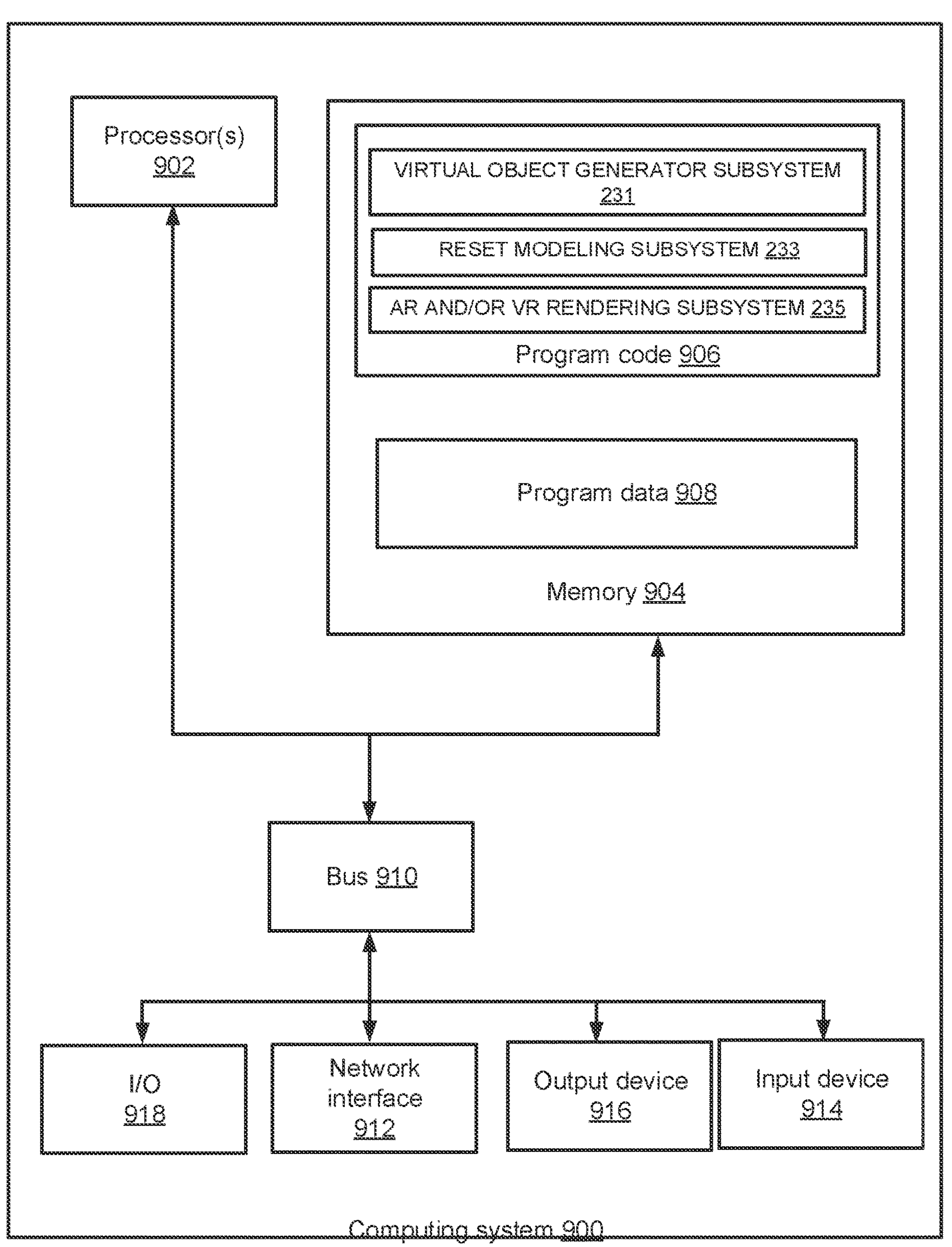
FIG. 9 depicts an example of a computing system that performs certain operations described herein, according to certain embodiments described in the present disclosure.

Any suitable computer system or group of computer systems can be used for performing the operations described herein. For example, FIG. 9 depicts an example of a computer system 900. The depicted example of the computer system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing program code 906, program data 908, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 804 can be volatile memory, non-volatile memory, or a combination thereof.

The computer system 900 executes program code 906 that configures the processor 902 to perform one or more of the operations described herein. Examples of the program code 906 include, in various embodiments, the modeling system 130 and subsystems thereof (including the virtual object generator subsystem 231, the reset modeling subsystem 233, and the AR and/or VR reset rendering subsystem 235) of FIG. 1, which may include any other suitable systems or subsystems that perform one or more operations described herein (e.g., one or more neural networks, encoders, attention propagation subsystem and segmentation subsystem). The program code 906 may be resident in the memory device 904 or any suitable computer-readable medium and may be executed by the processor 902 or any other suitable processor.

The processor 902 is an integrated circuit device that can execute the program code 906. The program code 906 can be for executing an operating system, an application system or subsystem, or both. When executed by the processor 902, the instructions cause the processor 902 to perform operations of the program code 906. When being executed by the processor 902, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 904 store the program data 908 that includes one or more datasets described herein. In some embodiments, one or more of data sets are stored in the same memory device (e.g., one of the memory devices 904). In additional or alternative embodiments, one or more of the programs, data sets, models, and functions described herein are stored in different memory devices 904 accessible via a data network. One or more buses 810 are also included in the computer system 900. The buses 910 communicatively couple one or more components of a respective one of the computer system 900.

In some embodiments, the computer system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computer system 900 is able to communicate with one or more other computing devices via a data network using the network interface device 912.

The computer system 900 may also include a number of external or internal devices, an input device 914, a presentation device 916, or other input or output devices. For example, the computer system 900 is shown with one or more input/output ("I/O") interfaces 918. An I/O interface 918 can receive input from input devices or provide output to output devices. An input device 914 can include any device or group of devices suitable for receiving visual, auditory, or other suitable input that controls or affects the operations of the processor 902. Non-limiting examples of the input device 914 include a touchscreen, a mouse, a keyboard, a microphone, a separate mobile computing device, etc. A presentation device 916 can include any device or group of devices suitable for providing visual, auditory, or other suitable sensory output. Non-limiting examples of the presentation device 916 include a touchscreen, a monitor, a speaker, a separate mobile computing device, etc.

Although FIG. 9 depicts the input device 914 and the presentation device 916 as being local to the computer system 900, other implementations are possible. For instance, in some embodiments, one or more of the input device 914 and the presentation device 916 can include a remote client-computing device (e.g., user computing device 110) that communicates with computing system 900 via the network interface device 912 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 10:
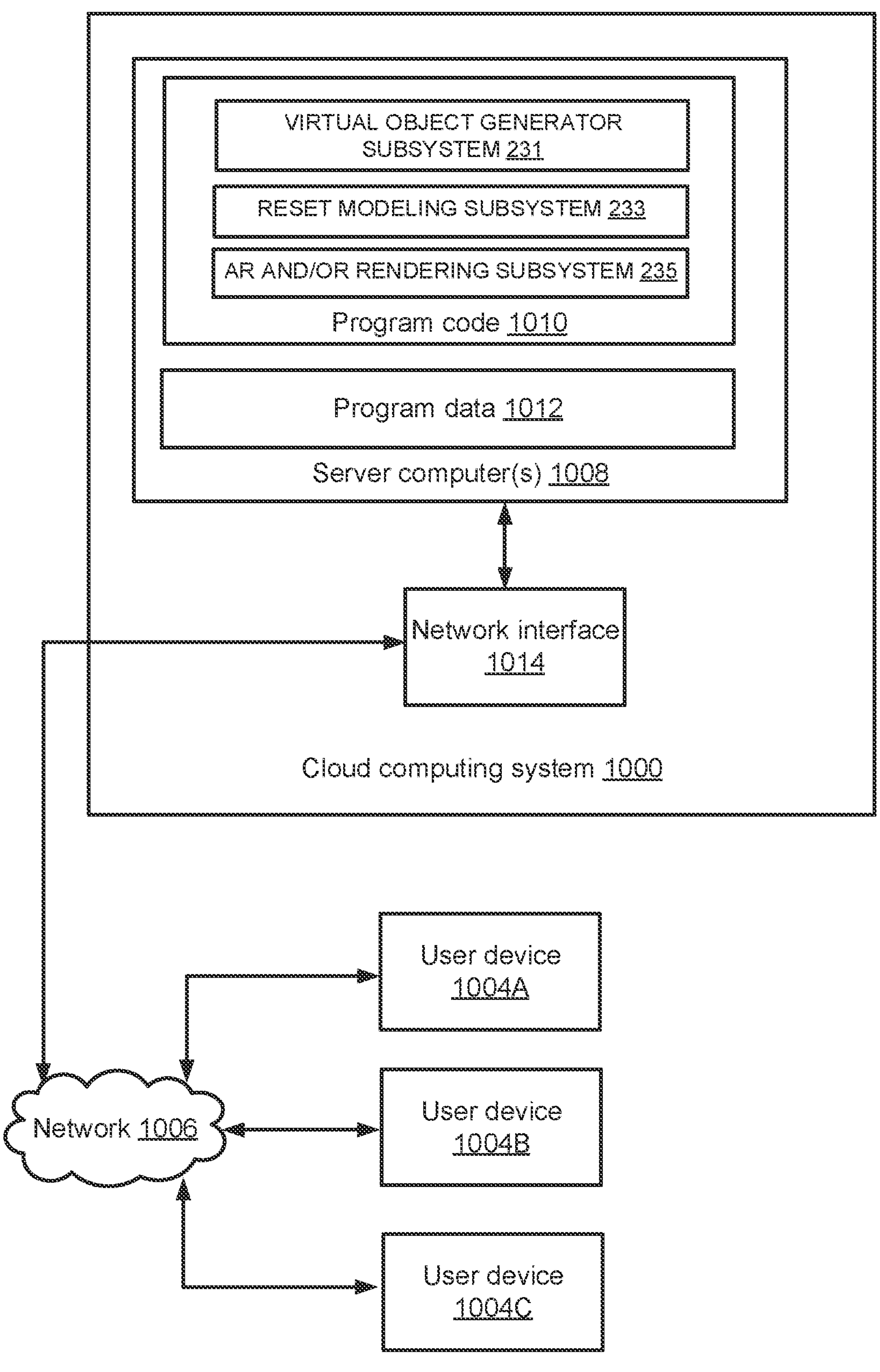
FIG. 10 depicts an example of a cloud computing system that performs certain operations described herein, according to certain embodiments described in the present disclosure.

In some embodiments, the functionality provided by computer system 900 may be offered as cloud services by a cloud service provider. For example, FIG. 10 depicts an example of a cloud computer system 1000 offering a service for generation of virtual objects 201, generation of virtual resets 203, and display of virtual resets 203 in an augmented reality view that can be used by a number of user subscribers using user devices 1004A, 1004B, and 1004C across a data network 1006. In the example, the service for generation of virtual objects 201, generation of virtual resets 203, and display of virtual resets 203 in an augmented reality view may be offered under a Software as a Service (SaaS) model. One or more users may subscribe to the service for generation of virtual objects 201, generation of virtual resets 203, and display of virtual resets 203 in an augmented reality view and the cloud computer system 1000 performs the processing to provide the service for generation of virtual objects 201, generation of virtual resets 203, and display of virtual resets 203 in an augmented reality view to subscribers. The cloud computer system 1000 may include one or more remote server computers 1008.

The remote server computers 1008 include any suitable non-transitory computer-readable medium for storing program code 1010 (e.g., the modeling system 130 and the virtual object generator subsystem 231, the reset modeling subsystem 233, and the AR and/or VR reset rendering subsystem 235 of FIG. 1) and program data 1012, or both, which is used by the cloud computer system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1008 can include volatile memory, non-volatile memory, or a combination thereof.

One or more of the server computers 1008 execute the program code 1010 that configures one or more processors of the server computers 1008 to perform one or more of the operations that provide virtual object generation, virtual reset generation, and augmented-reality-view display of virtual reset services. As depicted in the embodiment in FIG. 10, the one or more servers providing the services for generation of virtual objects 201, generation of virtual resets 203, and display of virtual resets 203 in an augmented reality view may implement the modeling system 130 and the virtual object generator subsystem 231, the reset modeling subsystem 233, and the AR and/or VR reset rendering subsystem 235. Any other suitable systems or subsystems that perform one or more operations described herein (e.g., one or more development systems for configuring an interactive user interface) can also be implemented by the cloud computer system 1000.

In certain embodiments, the cloud computer system 1000 may implement the services by executing program code and/or using program data 1012, which may be resident in a memory device of the server computers 1008 or any suitable computer-readable medium and may be executed by the processors of the server computers 808 or any other suitable processor.

In some embodiments, the program data 1012 includes one or more datasets and models described herein. In some embodiments, one or more of data sets, models, and functions are stored in the same memory device. In additional or alternative embodiments, one or more of the programs, data sets, models, and functions described herein are stored in different memory devices accessible via the data network 1006.

The cloud computer system 1000 also includes a network interface device 1014 that enable communications to and from cloud computer system 1000. In certain embodiments, the network interface device 1014 includes any device or group of devices suitable for establishing a wired or wireless data connection to the data networks 1006. Non-limiting examples of the network interface device 1014 include an Ethernet network adapter, a modem, and/or the like. The service for generation of virtual objects 101, generation of virtual resets 103, and display of virtual resets 103 in an augmented reality view is able to communicate with the user devices 1004A, 1004B, and 1004C via the data network 1006 using the network interface device 1014.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method comprising:
generating a virtual object by:
receiving, via a user interface of a device, a selection of a three-dimensional shape that includes a first plurality of faces;
receiving, by the device, an image showing a portion of a real-world object;
determining an area of the image that shows the portion of the real-world object;
superimposing the area of the image on a face of the first plurality of faces of the three-dimensional shape; and
associating, in the virtual object or in metadata of the virtual object, properties comprising at least one of one or more dimensions or a weight of a physical object represented by the virtual object; and
generating a virtual model of a physical reset, wherein the virtual model of the physical reset comprises a virtual model of a shelf of the physical reset and the virtual object is disposed on the virtual model of the shelf.

2. The computer-implemented method of claim 1, wherein the properties comprise the one or more of dimensions or the weight of the physical object represented by the virtual object.

3. The computer-implemented method of claim 1, further comprising:
generating a second virtual object by:
receiving, via the user interface of a device, a selection of a second three-dimensional shape that includes a second plurality of faces;
receiving, by the device, a second image showing a portion of a second real-world object;
determining an area of the second image that shows the portion of the real-world object;
superimposing the area of the second image on a face of the second plurality of faces of the second three-dimensional shape; and
associating, in the virtual object or in metadata of the virtual object, at least one of one or more dimensions or a weight of a second physical object represented by the second virtual object; and
wherein the virtual model of the physical reset comprises the second virtual object disposed on the virtual model of the shelf.

4. The computer-implemented method of claim 3, wherein each of the three-dimensional shape and the second three dimensional shape comprises one or more of a cube, a rectangular prism, a sphere, a spheroid, a cylinder, a cone, or a pyramid.

5. The computer-implemented method of claim 1, further comprising, responsive to receiving input of properties, presenting, via the user interface, a request for the image.

6. The computer-implemented method of claim 1, wherein superimposing the area of the image on the face of the three-dimensional shape comprises:
presenting, via the user interface, the image imposed on the face, the image showing, in addition to the portion of the real-world object, a portion of a space where the real-world object is located;
providing, via the user interface, resizing objects selectable to enable resizing of the image, wherein the resizing objects are placed on detectable boundaries in the image between the real-world object and the space; and
resizing the image to correspond to an area of the face responsive to receiving inputs including a change in position of one or more of the resizing objects.

7. The computer-implemented method of claim 1, wherein associating, in the virtual object or in metadata of the virtual object, the properties comprising at least one of one or more dimensions or a weight of the physical object represented by the virtual object comprises:
presenting, via the user interface, the image imposed on the face, wherein boundaries of the portion of the real-world object in the image do not correspond with boundaries of the face;
providing, via the user interface, a rotation object selectable to enable rotation of the image; and
rotating the image, responsive to receiving inputs to the rotation object, so that the boundaries of the real-world object in the image correspond to the boundaries of the face.

8. The computer-implemented method of claim 1, wherein associating, in the virtual object or in metadata of the virtual object, the properties comprising at least one of one or more dimensions or a weight of the physical object represented by the virtual object comprises:

presenting, via the user interface, the image imposed on the face, wherein boundaries of the portion of the real-world object in the image do not correspond with boundaries of the face;

providing, via the user interface, an editing interface object selectable to enable editing of the image; and editing the image, responsive to receiving inputs to the editing interface object, so that the boundaries of the portion of the real-world object in the image correspond to the boundaries of the face.

9. The computer-implemented method of claim 8, further comprising:

presenting, in the user interface, the boundaries of the real-world object in the image; and presenting, in the user interface, the boundaries of the face.

10. The computer-implemented method of claim 8, wherein superimposing the image on the face comprises superimposing a portion of the image defined by the boundaries of the real-world object in the image.

11. The computer-implemented method of claim 1, wherein generating the virtual object comprises:

presenting a request for a second image corresponding to a second face of the plurality of faces of the three-dimensional shape;

receiving the second image showing a second portion of the real-world object;

determining a second area of the second image that corresponds to the second portion of the real-world object; and superimposing, in the virtual object, the second area of the image with the second face.

12. The computer-implemented method of claim 11, wherein generating the virtual model of the physical reset comprises rotating the virtual object to present the second face.

13. The computer-implemented method of claim 1, wherein generating the virtual object further comprises:

receiving one or more other images, each of the one or more other images showing a corresponding other portion of the real-world object;

determining, for each of the one or more other images, an area of the image that corresponds to the corresponding other portion of the real-world object; and for each of the one or more other images, superimposing, in the virtual object, the area of the other image with a corresponding face of the plurality of faces of the three-dimensional shape.

14. The computer-implemented method of claim 1, wherein generating the virtual object further comprises:

determining that the face does not have an associated image, wherein each of the first plurality of faces except for the face has a respective associated image; and responsive to determining that the face does not have the associated image, presenting, via the user interface, a request for the image, wherein the image is received responsive to requesting the image.

15. The computer-implemented method of claim 1, further comprising uploading the virtual object to a data store.

16. The computer-implemented method of claim 1, further comprising:

responsive to receiving, via the user interface, a request to include a second virtual object in the virtual model of the physical reset, wherein the second virtual object is different from the virtual object, retrieving the second virtual object from a data store;

presenting the second virtual object in the user interface, wherein the second virtual object comprises a quantity of faces, each of the quantity of faces having an image superimposed upon the face; and presenting properties of a physical object represented by the second virtual object in the user interface.

17. The computer-implemented method of claim 1, wherein the portion of the real-world object comprises a side or a surface of the real-world object.

18. The computer-implemented method of claim 1, further comprising receiving an input indicating the properties of the physical object represented by the virtual object.

19. A system comprising:

a processor; and a non-transitory computer readable medium storing computer-readable program instructions that, when executed by the processor, cause the system to perform operations comprising:

generating a virtual object by:

receiving, via a user interface of a device, a selection of a three-dimensional shape that includes a first plurality of faces;

receiving, by the device, an image showing a portion of a real-world object;

determining an area of the image that shows the portion of the real-world object;

superimposing the area of the image on a face of the first plurality of faces of the three-dimensional shape; and associating, in the virtual object or in metadata of the virtual object, properties comprising at least one of one or more dimensions or a weight of a physical object represented by the virtual object; and generating a virtual model of a physical reset, wherein the virtual model of the physical reset comprises a virtual model of a shelf of the physical reset and the virtual object is disposed on the virtual model of the shelf.

20. A non-transitory computer-readable medium having program code that is stored thereon, the program code executable by one or more processing devices for performing operations comprising:

generating a virtual object by:

receiving, via a user interface of a device, a selection of a three-dimensional shape that includes a first plurality of faces;

receiving, by the device, an image showing a portion of a real-world object;

determining an area of the image that shows the portion of the real-world object;

superimposing the area of the image on a face of the first plurality of faces of the three-dimensional shape; and associating, in the virtual object or in metadata of the virtual object, properties comprising at least one of one or more dimensions or a weight of a physical object represented by the virtual object; and generating a virtual model of a physical reset, wherein the virtual model of the physical reset comprises a virtual model of a shelf of the physical reset and the virtual object is disposed on the virtual model of the shelf.

* * * * *